US007733942B2

(12) United States Patent
Hasegawa

(10) Patent No.: US 7,733,942 B2
(45) Date of Patent: Jun. 8, 2010

(54) INTERFERENCE REDUCTION RECEIVING DEVICE AND METHOD THEREOF

(75) Inventor: Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 11/700,099

(22) Filed: Jan. 31, 2007

(65) Prior Publication Data

US 2007/0177660 A1 Aug. 2, 2007

(30) Foreign Application Priority Data

Feb. 2, 2006 (JP) ............................ 2006-025553

(51) Int. Cl.
*H04B 1/00* (2006.01)

(52) U.S. Cl. ...................................... 375/148; 375/150

(58) Field of Classification Search ................ 375/140, 375/142–145, 136, 147–148, 150, 152, 349, 375/347

See application file for complete search history.

(56) References Cited

U.S. PATENT DOCUMENTS

| | | | | |
|---|---|---|---|---|
| 6,363,104 | B1 | 3/2002 | Bottomley | |
| 6,714,585 | B1 | 3/2004 | Wang et al. | |
| 6,934,323 | B2 | 8/2005 | Hara | |
| 2003/0086482 | A1 | 5/2003 | Shimizu et al. | |
| 2004/0264558 | A1* | 12/2004 | Chae et al. | 375/148 |
| 2005/0248497 | A1* | 11/2005 | Chun et al. | 343/853 |
| 2005/0276315 | A1 | 12/2005 | Shimizu et al. | |
| 2005/0281358 | A1 | 12/2005 | Bottomley et al. | |
| 2006/0007904 | A1* | 1/2006 | Shimomura et al. | 370/342 |
| 2006/0013326 | A1* | 1/2006 | Yoshida | 375/260 |
| 2007/0047628 | A1* | 3/2007 | Fulghum et al. | 375/148 |
| 2007/0293269 | A1* | 12/2007 | Kuwahara et al. | 455/562.1 |
| 2008/0037691 | A1* | 2/2008 | Papathanasiou et al. | 375/347 |

FOREIGN PATENT DOCUMENTS

| | | |
|---|---|---|
| JP | 2002-527927 | 8/2002 |
| JP | 2003-503879 | 1/2003 |

(Continued)

OTHER PUBLICATIONS

Gregory E. Bottomley, Tony Ottosson, Yi-Pin Eric Wang, "A Generalized Rake Receiver for Interference Suppression". IEEE Journal on Selected Areas in Communications, vol. 18, Aug. 2000.

(Continued)

*Primary Examiner*—Emmanuel Bayard
(74) *Attorney, Agent, or Firm*—Myers Wolin, LLC

(57) ABSTRACT

A receiving device and a receiving method enabling the high-speed and high-accuracy interference reducing process are provided. The interference reduction receiving device despreading digital signal at a plurality of timings, multiplying each of the signals after being despread by a weight and combining the signals, comprises an estimation unit estimating channel response vector having, as elements, channel estimation values corresponding to the respective timings based on the digital signal, a quantizing unit quantizing the digital signal in the vicinity of the respective timings, a signal correlation matrix generation unit generating a signal correlation matrix having, as the element, each signal correlation value calculated based on the respective quantized signals, and an weight calculating unit calculating the weight based on the channel response vector and the signal correlation matrix.

16 Claims, 20 Drawing Sheets

FOREIGN PATENT DOCUMENTS

| | | |
|---|---|---|
| JP | 2003-133999 | 5/2003 |
| JP | 2005-354459 | 12/2005 |

OTHER PUBLICATIONS

T. Hasegawa et al.; "A Chip Correlation MMSE Receiver with Multipath Interference Correlative Timing for DS-CDMA Systems"; Vehicular Technology Conference, 2005, VTC 2005-Spring. 2005 IEEE 61st Stockholm, Sweden Apr. 30-May 1, 2005, Piscataway, NJ, USA, IEEE, May 30, 2005 pp. 1740-1744, XP010855722.
VTC 2006-Spring. 2006 IEEE 63rd Vehicular Technology Conference May 7-10, 2006 Melbourne, VIC., Australia, May 7, 2006, May 10, 2006; pp. 2256-2260, XP002435233m VTC 2006-Spring. 2006 IEEE 63rd Vehicular Technology Conference (IEEE Cat No. 06CH37718) IEEE Piscataway, NJ, USA, ISBN: 0-7803-9391-0.
European Search Report dated Jun. 19, 2007; Application No. 07101609.1-2411.

* cited by examiner

FIG. 9

| FINGER NUMBER | TIMING |
|---|---|
| 1 | $t_{11}$ |
| 2 | $t_{12}$ |
| 3 | $t_{22}$ |
| 4 | $t_{21}$ |
| 5 | $t_{33}$ |
| 6 | $t_{44}$ |
| 7 | $t_{13}$ |
| 8 | $t_{55}$ |
| ⋮ | ⋮ |

FIG. 14

| TIMING DIFFERENCE | COMPENSATION COEFFICIENT |
|---|---|
| 0 | 0. 7 |
| 1 | 0. 9 |
| 2 | 0. 95 |

FIG. 19

| TIMING DIFFERENCE | COMPENSATION COEFFICIENT |
|---|---|
| 0 | 0.9 |
| 1 | 0.9 |
| 2 | 0.95 |

INTERFERENCE REDUCTION RECEIVING DEVICE AND METHOD THEREOF

BACKGROUND OF THE INVENTION

1. Field of the Invention

The present invention relates to an interference reduction receiving device and a method thereof that are used in a communication system employing a CDMA (Code Division Multiple Access) method.

2. Description of the Related Art

A variety of high-speed and large-capacity wireless communication methods such as an HSDPA (High Speed Downlink Packet Access) method are proposed at the present. The communication system using the CDMA (Code Division Multiple Access) method also demands for a higher-performance demodulator than a conventional RAKE receiver in order to actualize high-speed and large-capacity wireless communications.

Further, there is multi-path interference that deteriorates a communication quality in this RAKE receiver. In this multi-path interference, mutual interference is caused due to mixture of reflected waves generated by reflection of radio waves on propagation paths and direct waves.

Accordingly, in the case of scheming to actualize the high-speed communications in the RAKE receiver, an important technology is a technology of efficiently reducing this multi-path interference. A G-RAKE (Generalized RAKE) receiver is proposed as this type of technology for reducing interference. One type of the G-RAKE receiver is such that respective signals at a timing of a peak detected in a delay profile (channel impulse response) of a multi-path signal and at other predetermined timings are each despread by a predetermined spreading code, and the signals further multiplied by weights and added up are thus outputted.

FIG. 20 is a diagram showing an outline of the conventional G-RAKE receiver, wherein there are included, in addition to the timings of peaks detected in a delay profile 15, other timings effective in eliminating the interference (refer to, e.g., Patent documents 1 and 2, and Non-Patent document 1). This type of G-RAKE receiver has an advantage that the characteristic is approximate to the best level while keeping an advantage that a calculation quantity for the weight multiplication gets small, and is therefore considered promising as a technology for reducing the interference.

Moreover, a weight w in the G-RAKE receiver is drawn as follows. To be specific, an output signal (complex signal) z of an adder 13 can be expressed such as:

$$z=w^H y$$

where y is a vector having, as elements, output signals (complex signals) of a plurality of correlators 14, and w is a vector of the weight. Herein, "H" represents Hermitian transposition.

Further, the vector y can be expressed by:

$$y=hs+n$$

where s is transmission data of a specified user, h is a vector of a channel estimation value, and n is a vector of noises containing the thermal noise the multi-path interference.

Herein, in terms of removing the noise component n from the output signal z, by using a covariance matrix R expressed by the following formula:

$$R=E[nn^H] \text{ (E[ ] represents an expected value)}$$

w used as the weight is expressed by the following formula:

$$w=R^{-1}h$$

FIG. 21 is a diagram showing an example of a circuit configuration for obtaining an element $R_{ij}$ of the covariance matrix in the conventional G-RAKE receiver. In the circuit illustrated in FIG. 21, the element $R_{ij}$ of the covariance matrix is obtained in the following manner. A pilot signal (CPICH: Common Pilot CHannel) in received data (chip data) is despread at a timing $t_i$ in a correlator 21, and, in an adder 23, a signal, into which the despread signals are averaged (averaging unit 22), is subtracted from the despread signals. Similarly, the pilot signal in the reception data is despread at a timing $t_j$ in a correlator 24, and, in an adder 26, a signal, into which the despread signals are averaged (averaging unit 25), is subtracted from the despread signals. Then, output signals from the adder 23 and from the adder 26 are multiplied in a multiplier 27, and the multiplied signals are averaged in an averaging unit 28, thereby obtaining the element $R_{ij}$ of the covariance matrix.

On the other hand, such a technology (refer to, e.g., Patent documents 3 and 4) of reducing the interference is disclosed that in the RAKE receiver, a despreading timing is set to a timing (MICT: Multi-path Interference Correlative Timing), wherein the MICT is in symmetrical position centering around one path timing from the other path timing corresponding to a time delay between arbitrary two paths. The Patent document 1 is "Japanese Unexamined Patent Publication No. 2002-527927." The Patent document 2 is "Japanese Unexamined Patent Publication No. 2003-503879." The Patent document 3 is "Japanese Patent Application Laid-Open Publication No. 2003-133999." The Patent document 4 is "Japanese Patent Application No. 2004-173793." The Non-Patent document 1 is "Gregory E. Bottomley, Tony Ottosson, Yi-Pin Eric Wang, "A Generalized RAKE Receiver for Interference Suppression", IEEE JOURNAL ON SELECTED AREAS IN COMMUNICATIONS, VOL. 18, No. 8, AUGUST 2000."

In the G-RAKE receiver described above, however, the weight used for reducing the interference is obtained from the covariance matrix having, as the element, the value acquired by use of the known pilot signal, and hence, though the reduction of the interference is actualized, a problem arises, wherein the processing is delayed due to a large arithmetic quantity thereof, and resultantly the high-speed communications can not be actualized. This is because the covariance matrix is obtained from a correlation with the noise component, and therefore the known signal must be subtracted from the received signals. If a spreading factor of the pilot signal is, e.g., 256, only one piece of data can be obtained for every 256 chips, so that the sufficiently accurate covariance matrix and, more essentially, the sufficiently accurate weight can not be obtained in a short period of time.

Moreover, Non-Patent document 1 given above does not show any specific suggestion about the timing effective in eliminating the interference, and a point of how the timing effective in eliminating the interference is determined, is also a problem.

SUMMARY OF THE INVENTION

It is an object of the present invention, which was proposed in view of those problems, to provide a receiving device and a receiving method that enable the high-speed and high-accuracy interference reducing process.

The present invention adopts the following configurations in order to solve the problems. Namely, the present invention is an interference reduction receiving device demodulating signal by despreading digital signal at a plurality of timings, by multiplying each of the signals after being despread by a weight corresponding to each of the timings at which to perform despreading, and by combining the signals. The interference reduction receiving device comprises an estimation unit estimating a channel response vector having, as elements, channel estimation values corresponding to each of the timings based on the digital signal, a quantizing unit quantizing the digital signal in the vicinity of each of the timings, a delaying unit delaying each of the quantized signals by a time difference between the timing corresponding to each of the quantized signals and another timings in the plurality of timings, a signal correlation matrix generation unit generating a signal correlation matrix having, as the element, each of the signal correlation values calculated based on each of the quantized signals and on each of the delay signals that has been delayed, and an weight calculating unit calculating each of the weights corresponding to each of the timings based on the channel response vector and the signal correlation matrix.

In the present invention, the weight corresponding to each despreading timing is calculated based on the channel response vector having, as the element, each channel estimation value corresponding to each despreading timing and on the signal correlation matrix having, as the element, the signal correlation value calculated based on the quantized signal of the digital signal before being despread, and the respective signals after being despread are combined by using this calculated weight.

Thus, the present invention is capable of generating the signal correlation matrix by using the signal correlation value without using the known pilot signal etc and therefore enables the weight to be generated at the high speed. More essentially, it is possible to increase the number of samples of the digital signals that can be processed for generating the weight and to obtain the sufficiently precise weight in a short period of time.

Moreover, in the present invention, the signal correlation matrix used for obtaining the weight is generated based on the quantized signal of the digital signal. The quantization is actualized by using, for example, a sign bit in the digital signal.

Hence, according to the present invention, the signal correlation value can be acquired with a less data quantity than by obtaining the signal correlation value in a normal manner, and hence it is feasible to greatly reduce the arithmetic quantity and to actualize the high-speed interference reducing process.

Further, each of the signal correlation values according to the present invention can set as a first correlation value obtained by multiplying and averaging the respective quantized signals and the delay signals delayed by the timings corresponding to the quantized signals, and as a second correlation value obtained by multiplying the quantized signals by the same quantized signals each other and averages these signals.

With this scheme, the weight corresponding to each despreading timing can be calculated.

Still further, the signal correlation matrix generation unit according to the present invention may include a compensating unit calculating each compensation coefficient for reducing a quantized error about the first correlation value or the second correlation value based on absolute value information of the first correlation value or the second correlation value, and compensating each signal correlation value based on each compensation coefficient.

In the present invention, the quantized error occurred because of obtaining the signal correlation value by use of the quantized signal is compensated in a way that uses the compensation coefficient calculated based on the absolute value information of each signal correlation value.

With this contrivance, according to the present invention, the highly accurate weight can be generated at the high speed. It has actually proven that the signal characteristic equal to the characteristic in the case of using the signal correlation value calculated by using all the data can be acquired if the thus-compensated signal correlation value is used.

Moreover, the signal correlation matrix generation unit according to the present invention may include a compensating unit calculating each compensation coefficient for reducing a quantized error about the first correlation value or the second correlation value in accordance with a time different about the timings related to the delay signals used for calculating each of the signal correlation values, and compensating each of the signal correlation values based on each compensation coefficient.

In the present invention, the quantized error occurred because of acquiring the signal correlation value by use of the quantized signal is compensated in a way that uses the compensation coefficient calculated corresponding to the time difference about the despreading timings used for calculating each signal correlation value.

With this scheme, according to the present invention, for instance, if the compensation coefficients corresponding to the time difference about the despreading timings are previously retained, the highly precise weight can be generated by the process of only extracting the compensation coefficient and making multiplication of the compensation coefficient, and hence the highly accurate weight can be generated at the high speed.

Furthermore, the compensating unit according to the present invention may determine whether the compensation of each signal correlation value is required or not by comparing the time difference about the timings related to the respective delay signals used for calculating the respective signal correlation values with a predetermined threshold value.

In the present invention, on the occasion of compensating each signal correlation value, for example, the compensation is determined to be done only in such a case that the time difference about the despreading timings used for calculating the signal correlation value is smaller than the predetermined threshold value. In terms of a nature of the signal correlation matrix calculated by use of the quantized signal, a difference from the expected value of the signal correlation value becomes larger as the time difference between the despreading timings gets smaller, and it is therefore possible, if only the signal correlation value with the large difference from the expected value is compensated, to retrain the arithmetic quantity and to actualize the high-speed weight generating process.

Yet further, the present invention is an interference reduction receiving device demodulating signals by despreading digital signals, at a plurality of timings, into which the signals received by a plurality of antennas are converted, by multiplying each of the signals after being despread by a weight corresponding to each of the timings at which to perform despreading and to each of the antennas, and by combining the signals. The interference reduction receiving device comprises an estimation unit calculating channel response vectors having, as elements, channel estimation values corresponding to each of the timings based on the digital signals, a quantizing unit quantizing each of the digital signals in the vicinity of each of the timings, a delaying unit delaying each of the quantized signals by a time difference between the timing corresponding to the quantized signal and another timing in the plurality of timings, a power calculating unit calculating received signal power of each digital signal, a signal correlation matrix generation unit compensating each signal correlation value calculated based on each quantized signal and on each delay signal in accordance with the received signal power of the digital signal that uses as source of this signal correlation value, and generating a signal correlation matrix having, as the element, the signal correlation value after being compensated, and weight calculating unit calculating each of the weights corresponding to the respective timings and the respective antennas based on the channel response vector and the signal correlation matrix.

According to the present invention, in the configuration including the plurality of antennas, each signal correlation value generated based on the quantized signal of each digital signal contains an error corresponding to a quantity of the received signal power of each digital signal that corresponds to each antenna, so that this error is compensated in accordance with the received signal power calculated by the power calculating unit.

With this contrivance, according to the present invention, even the receiving device including the plurality of antennas can generate the highly accurate weight also by using the signal correlation matrix calculated in a way that uses the quantized signal, and is therefore capable of actualizing the high-speed interference reducing process.

In such a case, the signal correlation matrix generation unit may set, as each of the signal correlation values, a first correlation value obtained by multiplying and averaging the respective quantized signals and the delay signals delayed by the timings corresponding to the quantized signals, a second correlation value obtained by multiplying and averaging each of the quantized signals and the delay signals each delayed by the timing corresponding to each of the signals corresponding to the other antennas that is quantized in the vicinity of the same timing as the respective quantized signals, and a third correlation value obtained by multiplying the respective quantized signals by the same quantized signals each other or by multiplying the signals quantized in the vicinity of the same timing by the same quantized signals each other and averaging these signals.

It should be noted that the present invention may also be a method of making a computer actualize any one of functions described above. Further, the present invention may also be a program that gets any one of the above functions actualized. Yet further, the present invention may also be a readable-by-computer storage medium stored with this program.

According to the present invention, it is possible to actualize the receiving device and the receiving method that enable the high-speed and high-accuracy interference reducing process.

BRIEF DESCRIPTION OF THE DRAWINGS

FIG. 9 is a diagram showing an example of a table in which to define the timings;

FIG. 14 is a diagram showing an example of a compensation coefficient table;

FIG. 19 is a diagram showing an example of a compensation coefficient table in the third embodiment;

DESCRIPTION OF THE PREFERRED EMBODIMENTS

An interference reduction receiver in each embodiment of the present invention will hereinafter be described with reference to the drawings. Configurations in the following embodiments are exemplifications, and the present invention is not limited to the configurations in the embodiments.

First Embodiment

To begin with, a CDMA (Code Division Multiple Access) transceiver device in a first embodiment of the present invention will hereinafter be explained.

[Device Configuration]

Figure 1:
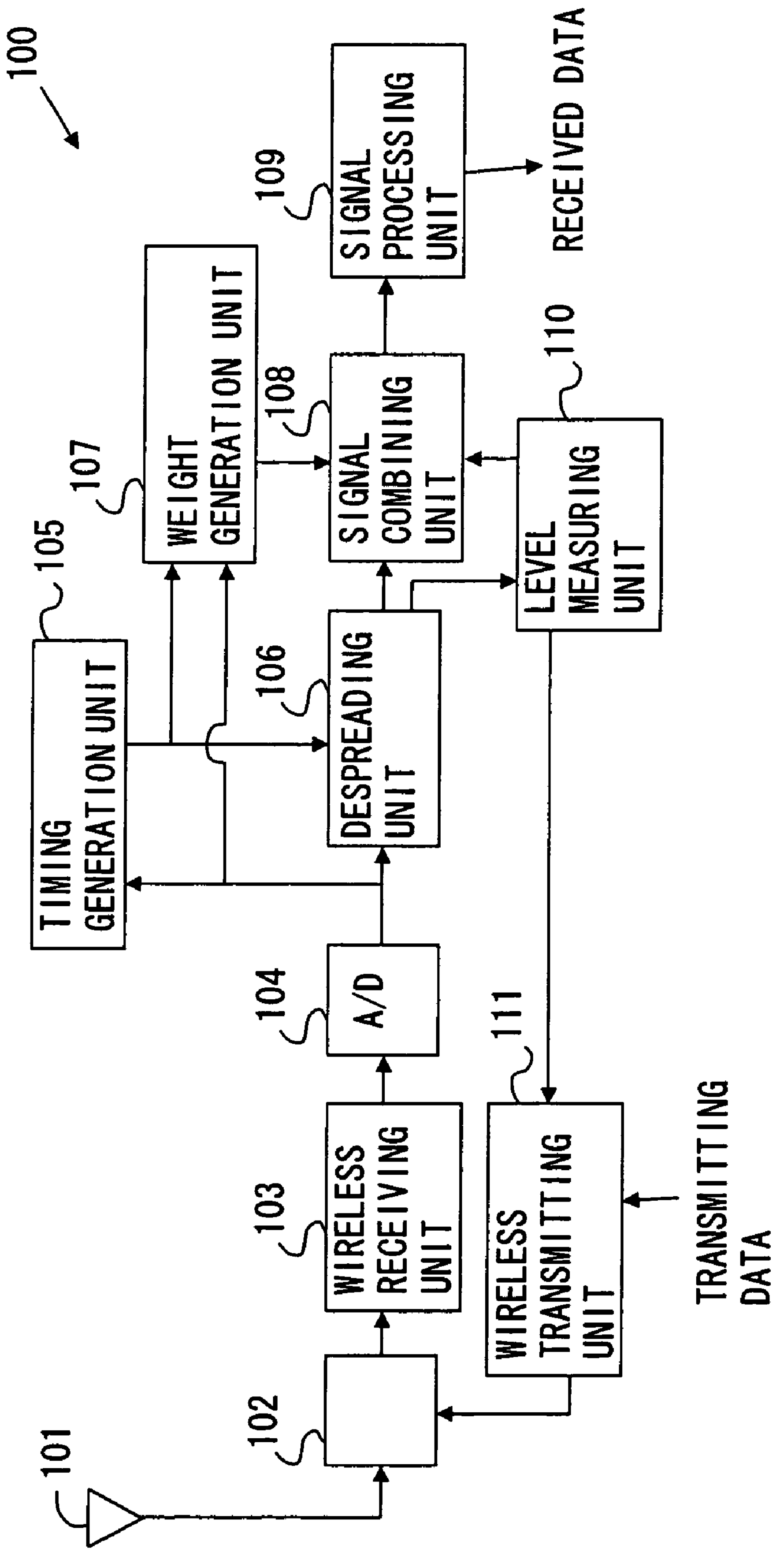
FIG. 1 is a diagram showing an example of a circuit configuration of a CDMA transceiver device in a first embodiment.

FIG. 1 is a diagram showing an example of a circuit configuration of the CDMA transceiver device in the first embodiment of the present invention. A radio signal received by an antenna 101 is demodulated in a wireless receiving unit 103 via a duplexer 102, and is converted into a digital signal (sample data) in an A/D converting unit 104. This sample data is supplied to a timing generation unit 105 and to a despreading unit 106, wherein the sample data is despread by a plurality of fingers of the despreading unit 106 in accordance with predetermined despreading timing generated by the timing generation unit 105.

Further, the sample data of the A/D converting unit 104 and the timing of the timing generation unit 105 are also supplied to a weight generation unit 107, wherein weights corresponding to the plurality of fingers of the despreading unit 106 are generated. Then, despread output signals of the plurality of fingers of the despreading unit 106 are combined by a signal combining unit 108 in accordance with the weights given from the weight generation unit 107, and the combined signal undergoes channel decoding etc in a signal processing unit 109 and thereby becomes received data.

On the other hand, the despread output signals of the despreading unit 106 are supplied to a level measuring unit 110, then feedback control is applied to the signal combining unit 108 corresponding to a signal level, and transmission power of a wireless transmission unit 111, which modulates transmission data and transmits the modulated data via the duplexer 102 and the antenna 101, is controlled.

<Detailed Configurations of Timing Generation Unit, Despreading Unit and Signal Combining Unit>

Figure 2:
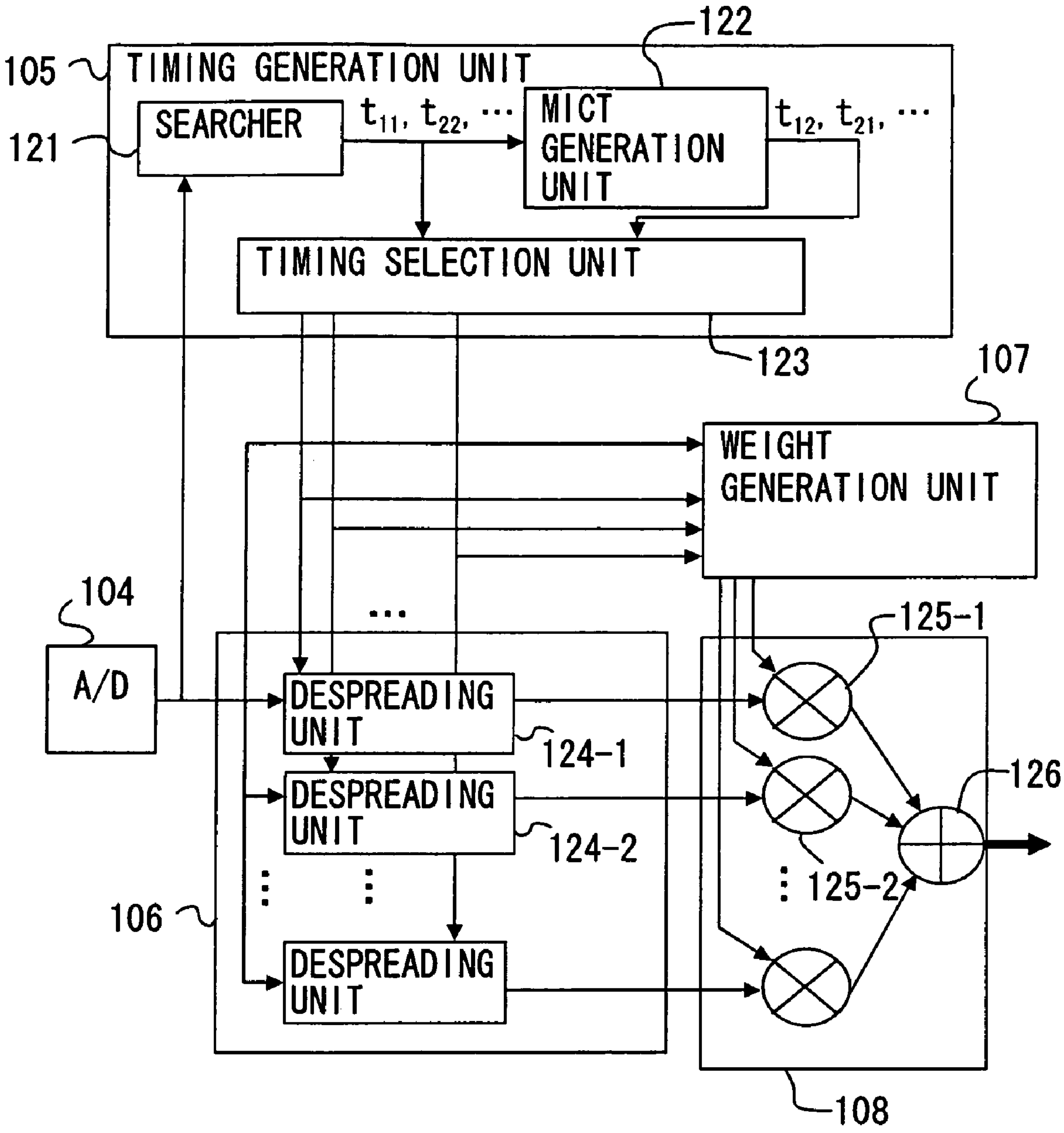
FIG. 2 is a diagram showing an example of detailed circuit configurations of a timing generation unit, a despreading unit and a signal combining unit in the first embodiment.

FIG. 2 is a diagram illustrating an example of detailed circuit configurations of the timing generation unit 105, the despreading unit 106 and the signal combining unit 108 in FIG. 1. As shown in FIG. 2, the timing generation unit 105 includes a searcher 121, an MICT generation unit 122 and a timing selection unit 123.

The searcher 121 generates timings (which are timings in the normal type of RAKE receiver and will therefore hereinafter be referred to as [RAKE timings]) $t_{11}$, $t_{22}$, . . . each corresponding to an occurrence delay-time of an impulse response on one through a plurality of paths from the sample data that is output from the A/D converting unit 104. The MICT generation unit 122 generates, based on the RAKE timings, timings (MICT) $t_{12}$, $t_{21}$, . . . , wherein the MICT is in symmetrical position centering around one path timing from the other path timing corresponding to a delay-time between arbitrary two paths. The timing selection unit 123 selects proper timings from the RAKE timings of the searcher 121 and from the MICTs of the MICT generation unit 122.

The despreading unit 106 includes despreading units 124-1, 124-2, . . . , which configure the plurality of fingers.

The signal combining unit 108 includes multipliers 125-1, 125-2, . . . that multiply despreading outputs of the despreading units 124-1, 124-2, . . . by weights given from the weight generation unit 107 on a finger-by-finger basis, and includes an adder 126 that adds outputs of the multipliers 125-1, 125-2, . . . .

<Detailed Configuration of Weight Generation Unit>

Figure 3:
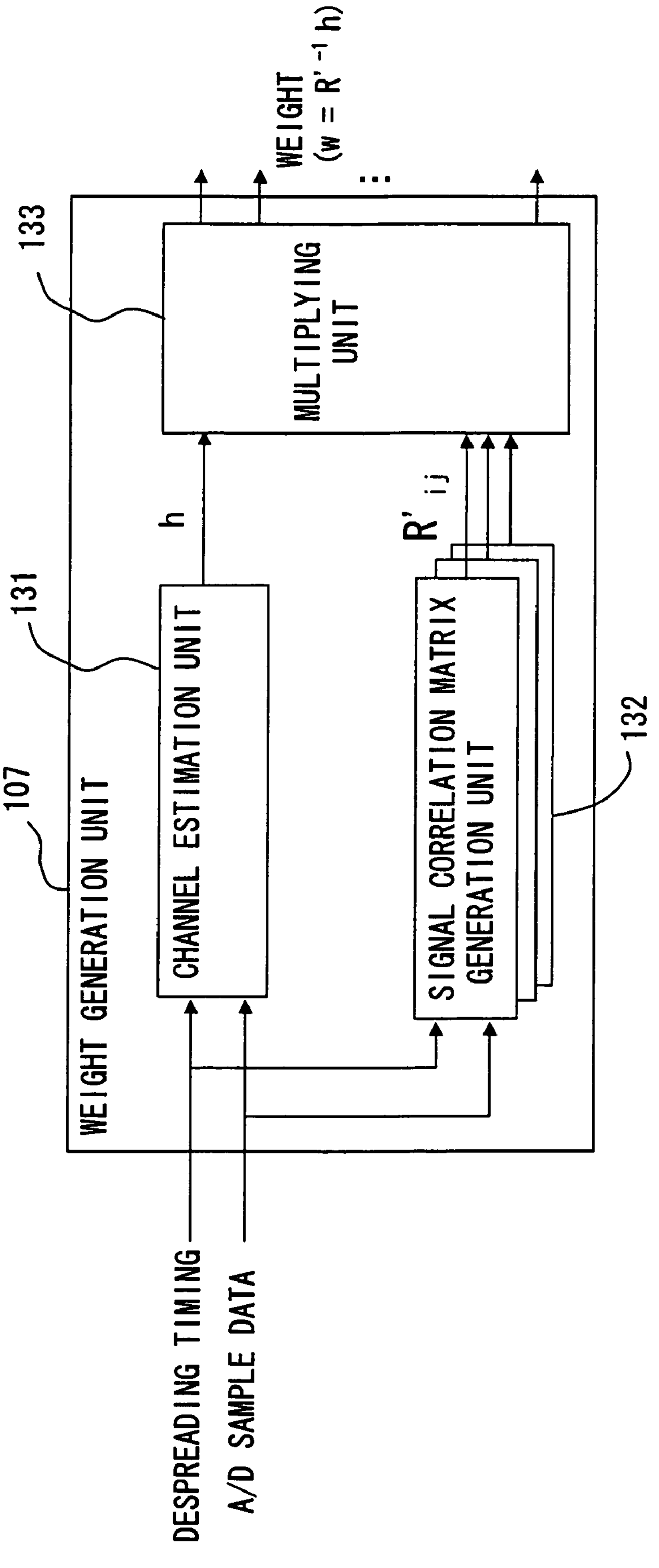
FIG. 3 is a diagram showing a detailed circuit configuration of a weight generation unit in the first embodiment.

FIG. 3 is a diagram showing an example of a detailed circuit configuration of the weight generation unit 107 in FIG. 1. As illustrated in FIG. 3, the weight generation unit 107 has a channel estimation unit 131, a signal correlation matrix generation unit 132 and a multiplying unit 133.

The channel estimation unit 131 performs channel estimation based on the timings given from the timing generation unit 105 and on the sample data given from the A/D converting unit 104, and thus generates a channel response vector h. The signal correlation matrix generation unit 132 obtains elements $R'_{ij}$ of a signal correlation matrix based on the timings given from the timing generation unit 105 and on the sample data given from the A/D converting unit 104. The multiplying unit 133 generates $R'^{-1}$ h from the channel response vector h generated by the channel estimation unit 131 and from the signal correlation matrix R' generated by the signal correlation matrix generation unit 132 and then multiplies $R'^{-1}$ by h, thereby generating a weight w.

<Detailed Configuration of Signal Correlation Matrix Generation Unit>

Figure 4:
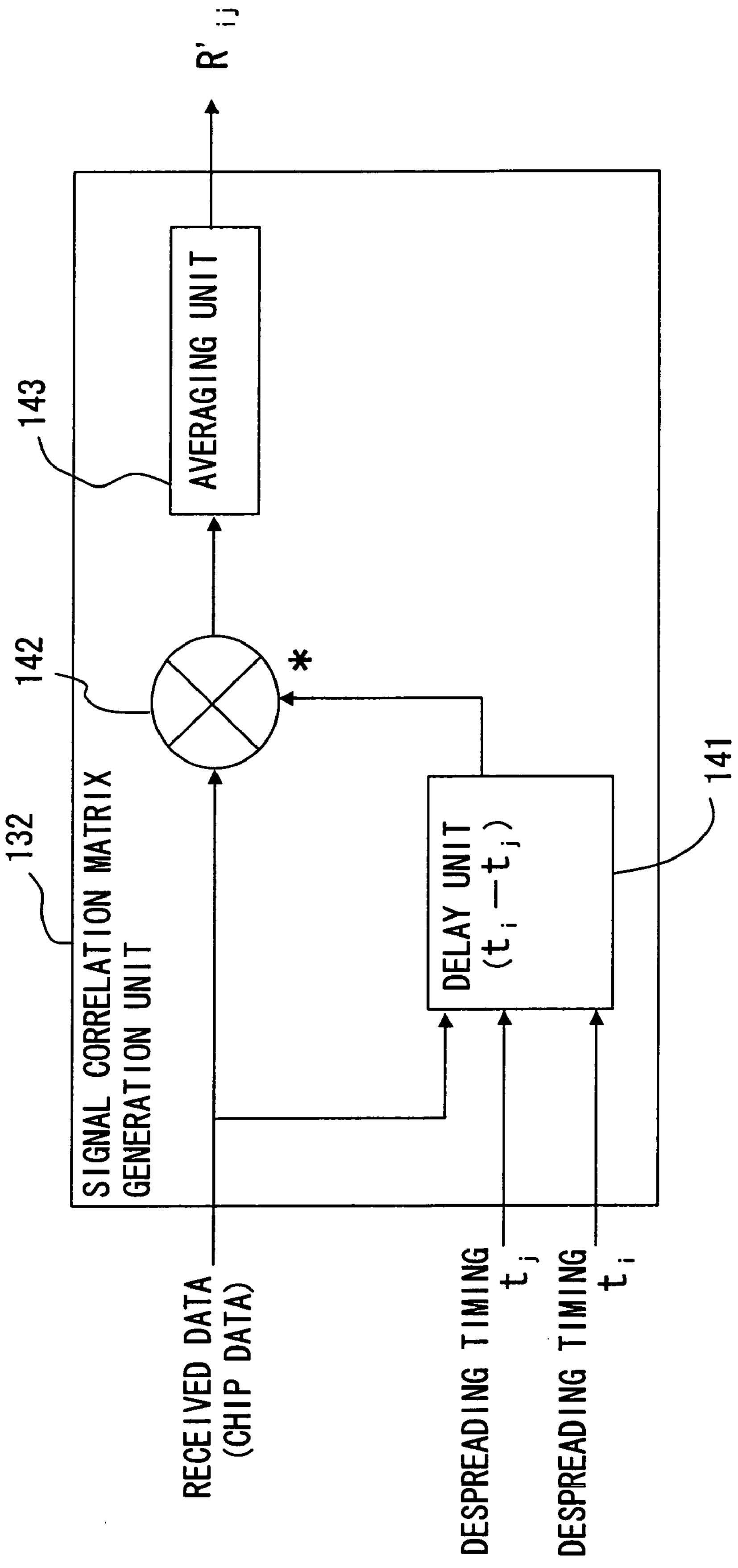
FIG. 4 is a diagram showing a detailed circuit configuration of a signal correlation matrix generation unit in the first embodiment.

FIG. 4 is a diagram showing an example of a detailed circuit configuration of the signal correlation matrix generation unit 132 in FIG. 3. As illustrated in FIG. 4, the signal correlation matrix generation unit 132 includes a delay unit 141, a multiplier 142 and an averaging unit 143.

The delay unit 141 gives, a delay-time corresponding to a time difference between a first timing $t_i$ and a second timing $t_j$ given from the timing generation unit 105, to the sample data given from the A/D converting unit 104. The multiplier 142 obtains a product of the sample data given from the A/D converting unit 104 and the output signal of the delay unit 141. The averaging unit 143 averages the output signals of the multiplier 142, and obtains the elements $R'_{ij}$ of the signal correlation matrix.

It is to be noted that the signal correlation matrix generation unit 132 is, other than the case of obtaining the elements $R'_{ij}$ of the signal correlation matrix with respect to all the sample data, capable of reducing a calculation quantity by acquiring samples at a predetermined time interval from all the sample data and capable of obtaining the elements $R'_{ij}$ of the signal correlation matrix based on the acquired samples. Namely, when obtaining the element $R'_{ij}$ of the signal correlation matrix with respect to all the sample data, the element $R'_{ij}$ is obtained by:

$$R'_{ij}=\Sigma p v(p)\times v^*(p+t_i-t_j)$$

where p is a sample data number, v(p) is a signal of the sample data, and asterisk [*] represents complex conjugate. When obtaining the element $R'_{ij}$ of the signal correlation matrix for every, e.g., 5 samples, the element $R'_{ij}$ is obtained by:

$$R'_{ij}=\Sigma p v(p\times 5)\times v^*(p\times 5+t_i-t_j)$$

<Comparison Between Weight Based on Signal Correlation Matrix and Weight Based on Covariance Matrix>

Considered next is a relationship between the signal correlation matrix R' in the present invention and a covariance matrix R in the conventional G-RAKE receiver.

To start with, let $v_i$ be the received data (sample data) at a certain timing $t_i$, and this received signal $v_i$ is expressed by the following Formula (1).

[Mathematical Expression 1]

$$v_i=\sum_{k=-\infty}^{\infty} a_k h(t_i-kT)+n_i \tag{1}$$

Herein, $a_k$ is a chip sequence after spreading, h( ) is an impulse response, $n_i$ is a noise, T is a length (time) of one chip, and $v_i$ is a sum of the impulse responses of the signals of the respective chips. Hereat, a correlation between the received signal $v_i$ at the timing $t_i$ and the received signal $v_j$ at the timing $t_j$ is given in the following Formula (2).

[Mathematical Expression 2]

$$\begin{aligned}\langle v_i v_j^*\rangle &= \left\langle\left(\sum_{k=-\infty}^{\infty} a_k h(t_i-kT)+n_i\right)\left(\sum_{l=-\infty}^{\infty} a_l h(t_j-lT)+n_j\right)^*\right\rangle \\ &= \sum_{k=-\infty}^{\infty}\sum_{l=-\infty}^{\infty}\langle a_k a_l^*\rangle h(t_i-kT)h^*(t_j-lT)+\langle n_i n_j^*\rangle\end{aligned} \tag{2}$$

-continued $$= \sum_{k=-\infty}^{\infty} \langle |a_k|^2 \rangle h(t_i - kT) h^*(t_j - kT) + \langle n_i n_j^* \rangle$$

However, <x> represents an average value of x, and the Formula utilizes that $a_k$, $a_l$, $n_k$, $n_l$ are uncorrelated to each other. This represents the signal correlation matrix according to the present invention, and, when setting the average power of $a_k$ to "1" in a more simplified manner, the signal correlation matrix can be expressed as in the following Formula (3).

[Mathematical Expression 3]

$$R'_{ij} = \sum_{k=-\infty}^{\infty} h(t_i - kT) h^*(t_j - kT) + \langle n_i n_j^* \rangle \tag{3}$$

Next, interference of the received signal $v_i$ and a noise component will be considered. Supposing that $a_0$ is the chip sequence corresponding to a now-emphasized signal, only $a_0$ in $v_i$ is the signal while other signals are interference signals or noise signals, and hence the noise component $I_i$ is what $a_0$ is removed from $v_i$. The interference and the noise component $I_i$ is given by the following Formula (4), which is different from the Formula of $v_i$ in terms of removing [k=0] from conditions for taking a total sum.

[Mathematical Expression 4]

$$I_i = \sum_{\substack{k=-\infty \\ k \neq 0}}^{\infty} a_k h(t_i - kT) + n_i \tag{4}$$

The correlation is similarly obtained with respect to this $I_i$ as by the following Formula (5).

[Mathematical Expression 5]

$$\langle I_i I_j^* \rangle = \sum_{\substack{k=-\infty \\ k \neq 0}}^{\infty} \langle |a_k|^2 \rangle h(t_i - kT) h^*(t_j - kT) + \langle n_i n_j^* \rangle \tag{5}$$

This represents a covariance matrix in the conventional G-RAKE receiver, and, when setting the average power of $a_k$ to "1" in the more simplified manner, the covariance matrix can be expressed as by the following Formula (6).

[Mathematical Expression 6]

$$R_{ij} = \sum_{\substack{k=-\infty \\ k \neq 0}}^{\infty} h(t_i - kT) h^*(t_j - kT) + \langle n_i n_j^* \rangle \tag{6}$$

It should be noted that the correlation of the noise is herein acquired based on the signal before the despreading but can be similarly acquired even after the despreading, and there is no essential difference because of only being multiplied by a spreading factor (SF) on the whole.

From the Formulae (3) and (6) given above, the following relationship is drawn.

$$R = R' - hh^H$$

Then, let w be the weight obtained from the covariance matrix and w' be the weight obtained from the signal correlation matrix, and the following relationships are established.

$$Rw = h$$

$$R'w' = h$$

Hence, the transformation can be done as below.

$$R'w = hh^H w + h$$

$$R'w = h(h^H w + 1)$$

$$w = w'(h^H w + 1)$$

Then, it is recognized that both of weights simply undergo scalar multiplication and are equal to each other. Accordingly, a convergence velocity with respect to an average number of the matrix elements is on the same order of velocity, and the signal correlation matrix can, as compared with the covariance matrix, be obtained at the high velocity on the same order as a spreading ratio.

Figure 5:
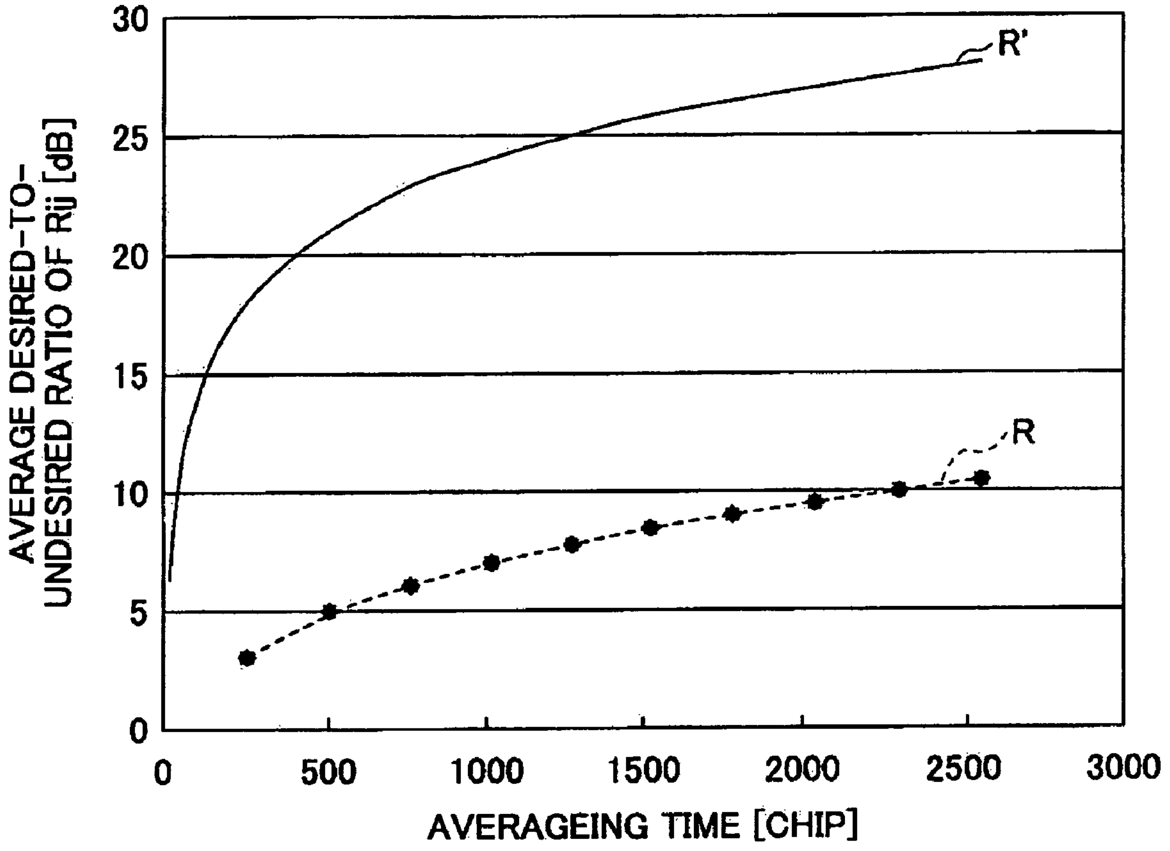
FIG. 5 is a diagram showing an example of a relationship between chip averaging time and reliability of a matrix calculation value.

FIG. 5 is a diagram showing an example of a relationship between chip averaging time and reliability of a matrix calculation value, wherein it is understood that the signal correlation matrix R' depicted by a solid line according to the present invention has, though given in an environment where three paths exhibiting the same intensity exist, higher accuracy with respect to even the averaging for a short period of time than the covariance matrix R depicted by a broken line in the conventional G-RAKE receiver has.

<Selection of Despreading Timing>

Given next is an explanation about selection of timing in the timing generation unit 105 in FIGS. 1 and 2.

Figure 6:
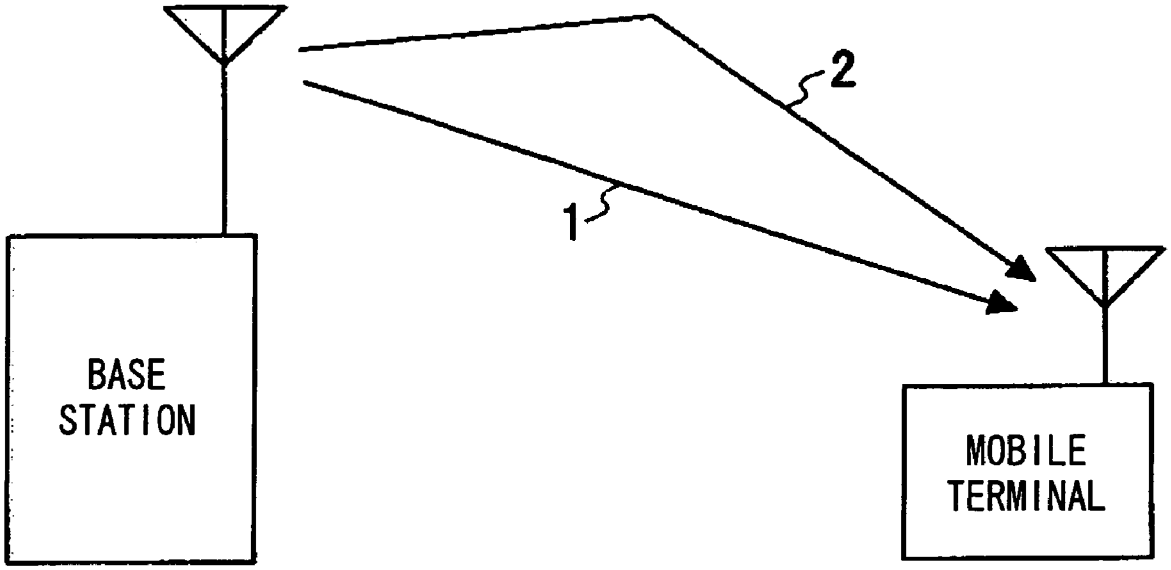
FIG. 6 is a conceptual diagram of multi-paths between a base station and a mobile terminal.
Figure 7:
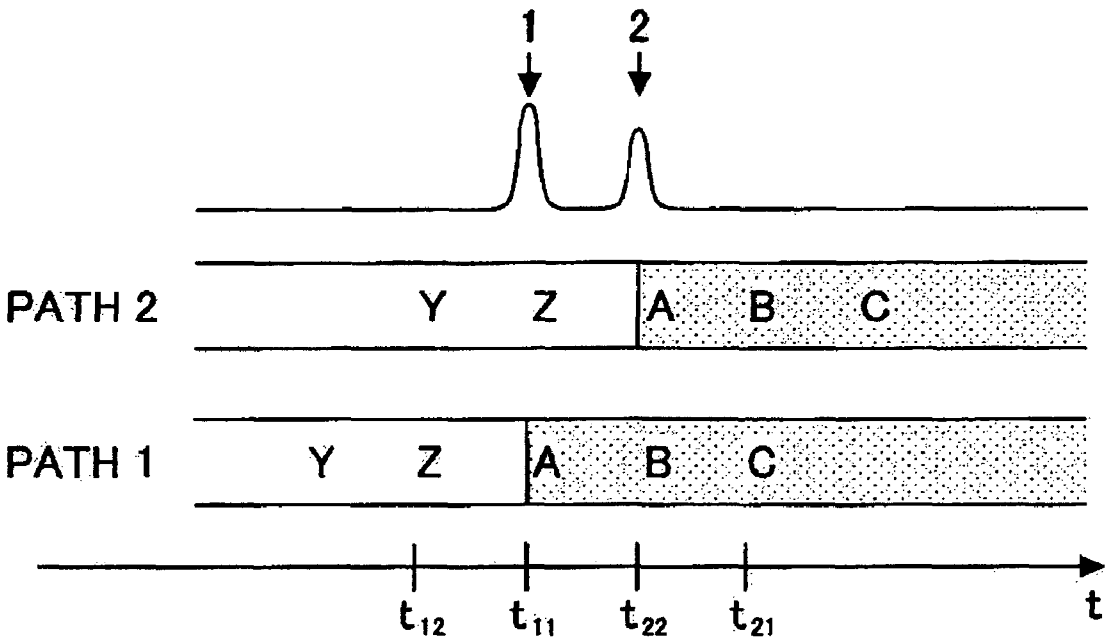
FIG. 7 is a diagram showing an example of a relationship between impulse responses and despreading timings of paths 1 and 2.

FIG. 6 is a conceptual diagram of multi-paths between a base station and a mobile terminal, showing a case where two paths 1 and 2 exist between the base station and the mobile terminal. FIG. 7 is a diagram showing an example of a relationship between impulse responses and despreading timings of the paths 1 and 2 in the environment in FIG. 6, wherein timings $t_{11}$, $t_{22}$ are detectable as the RAKE timings, and timings $t_{12}$, $t_{21}$ are detectable as MICTs. Herein, the timing $t_{12}$ is in symmetrical position centering around timing $t_{11}$ from the timing $t_{22}$ corresponding to a delay-time between the two paths 1 and 2, and it is possible to cancel a component of the path 2 that is contained as interference in the signal despread at the timing $t_{11}$ by adding the finger despreading at the timing $t_{12}$.

Namely, the signal, which is despread at the timing $t_{11}$, contains the interference component despread from a chip Z of the path 2 in addition to the signal that is normally despread from a chip A of the path 1, however, the interference component despread from the chip Z of the path 1 can be obtained by adding the finger depsreading at the timing $t_{12}$ and has the same contents as that of the interference components despread from the chip Z of the path 2, and hence this interference component can be utilized for the cancellation. A relationship between the timing $t_{22}$ and the timing $t_{21}$ is the same.

Figure 8:
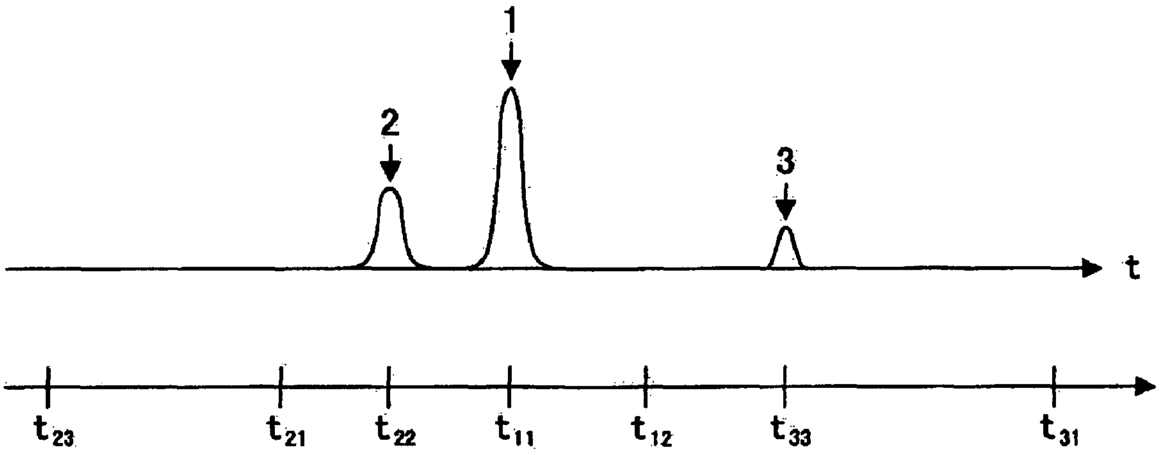
FIG. 8 is a diagram showing an example of timings in a case where the paths 1, 2 and 3 exist.

FIG. 8 is a diagram showing an example of the timings in a case where three paths 1, 2 and 3 exist. The timings $t_{11}$, $t_{22}$ and $t_{33}$ as the RAKE timings and the timings $t_{12}$ and $t_{21}$ etc as the MICTs are usable as the despreading timings. Then, optimum timings can be obtained in the way that these timings are, as shown in FIG. 9, specified in a table in such a sequence from the highest as to be estimated effective in eliminating the interference theoretically or empirically, and the timing selection unit 123 (FIG. 2) of the timing generation unit 105 allocates these specified timings in the sequence from the highest order in the table, corresponding the number of the usable fingers.

<Another Configuration of Weight Generation Unit>

Figure 10:
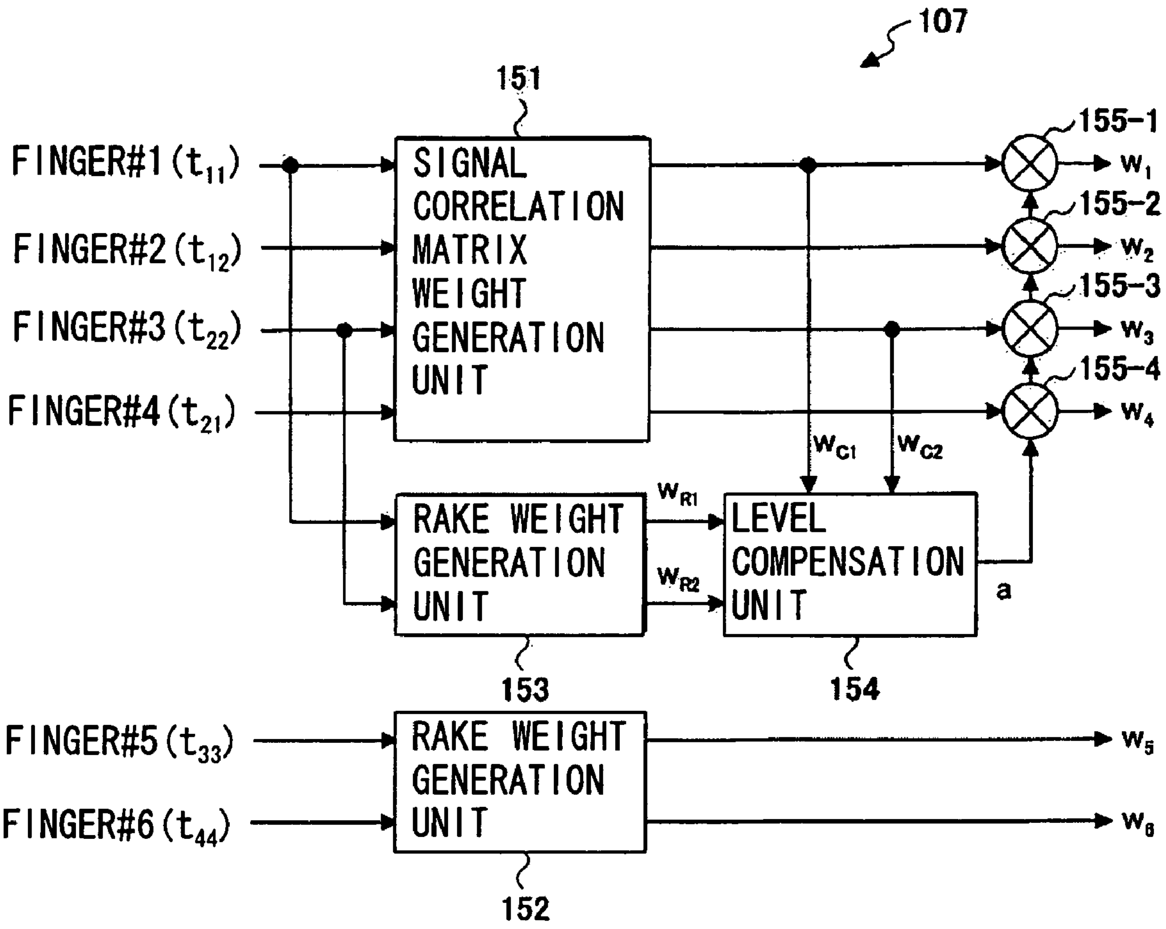
FIG. 10 is a diagram showing an example of another configuration of the weight generation unit.

FIG. 10 is a diagram illustrating an example of another configuration of the weight generation unit 107 in FIGS. 1 to 3, wherein a scheme is that an arithmetic quantity is reduced by obtaining part of the weights corresponding to the plurality of fingers based on the normal RAKE method. Namely, the weight exhibiting the high accuracy can be acquired in the short time by generating based on the signal correlation matrix according to the present invention, however, on the other hand, the arithmetic quantity slightly increases, and therefore the normal RAKE method is adopted with respect to the RAKE timings specified low-order in the sequence of being estimated effective in eliminating the interference in the fingers.

In FIG. 10, the weight generation unit 107 includes a signal correlation matrix weight generation unit 151 that generates the weights based on signal correlation matrix from the timings $t_{11}$, $t_{12}$, $t_{22}$ and $t_{21}$ corresponding to the fingers #1 to #4, and a RAKE weight generation unit 152 that generates the weights by the normal RAKE method from the timing $t_{33}$ and $t_{44}$ corresponding to the fingers #5 and #6.

The weight generation unit 107 further includes a RAKE weight generation unit 153 that generates the weights by the normal RAKE method from the timings $t_{11}$ and $t_{22}$ corresponding to the fingers #1 and #3 among the fingers #1 to #4 which timings serve as the RAKE timings in order to compensate the level between the weights generated based on the signal correlation matrix and the weights generated by the normal RAKE method, and a level compensation unit 154 that calculates an absolute value ratio of the weight obtained based on the same timing by the signal correlation matrix weight generation unit 151 and the weight obtained based on the same timing by the RAKE weight generation unit 153, and compensates the level through multipliers 155-1 to 155-4. Herein, the level compensation unit 154 calculates the ratio by the following Formula.

[Mathematical Expression 7]

$$a = \sqrt{\frac{|w_{R1}|^2 + |w_{R2}|^2}{|w_{C1}|^2 + |w_{C2}|^2}} \times b$$

Herein, a denominator represents total power of the weights at the RAKE timings in the weights generated based on the signal correlation matrix, and a numerator represents total power of the weights generated by the normal RAKE method at the RAKE timings corresponding to the denominator. Note that b is a proper coefficient and is a constant such as [½] and [2]. Further, the level compensating process would preferably be done to slightly increase the weight generated based on the high-accuracy signal correlation matrix rather than perfectly equalizing the level between the weight generated based on the signal correlation matrix and the weight generated by the normal RAKE method.

Second Embodiment

The CDMA transceiver device according to a second embodiment of the present invention will hereinafter be described. The CDMA transceiver device in the first embodiment discussed earlier improves the received signal characteristic by using, when combining the despread-signals, the weight acquired in a way that multiplies an inverse matrix of the signal correlation matrix that is calculated from the received signal before despreading by the channel vector subjected to the channel estimation.

The CDMA transceiver device in the second embodiment acquires the high-accuracy weight at a high velocity in a way that reduces the arithmetic quantity in the calculation of the signal correlation matrix while keeping advantages of the first embodiment by generating the signal correlation matrix in the first embodiment, which involves using only a sign bit of the received signal. It should be noted that the CDMA transceiver device in the second embodiment is suited to a communication device including one single transceiver antenna.

[Device Configuration]

The CDMA transceiver device in the second embodiment is constructed of the same functional units as those in the first embodiment (see FIGS. 1 to 3). The signal correlation matrix generation unit 132 in the weight generation unit 107 has, however, a different configuration from that in the first embodiment and will therefore be explained as below. The same other functional units as those in the first embodiment are marked with the same numerals and symbols, and their explanations are omitted.

<Detailed Configuration of Signal Correlation Matrix Generation Unit>

Figure 11:
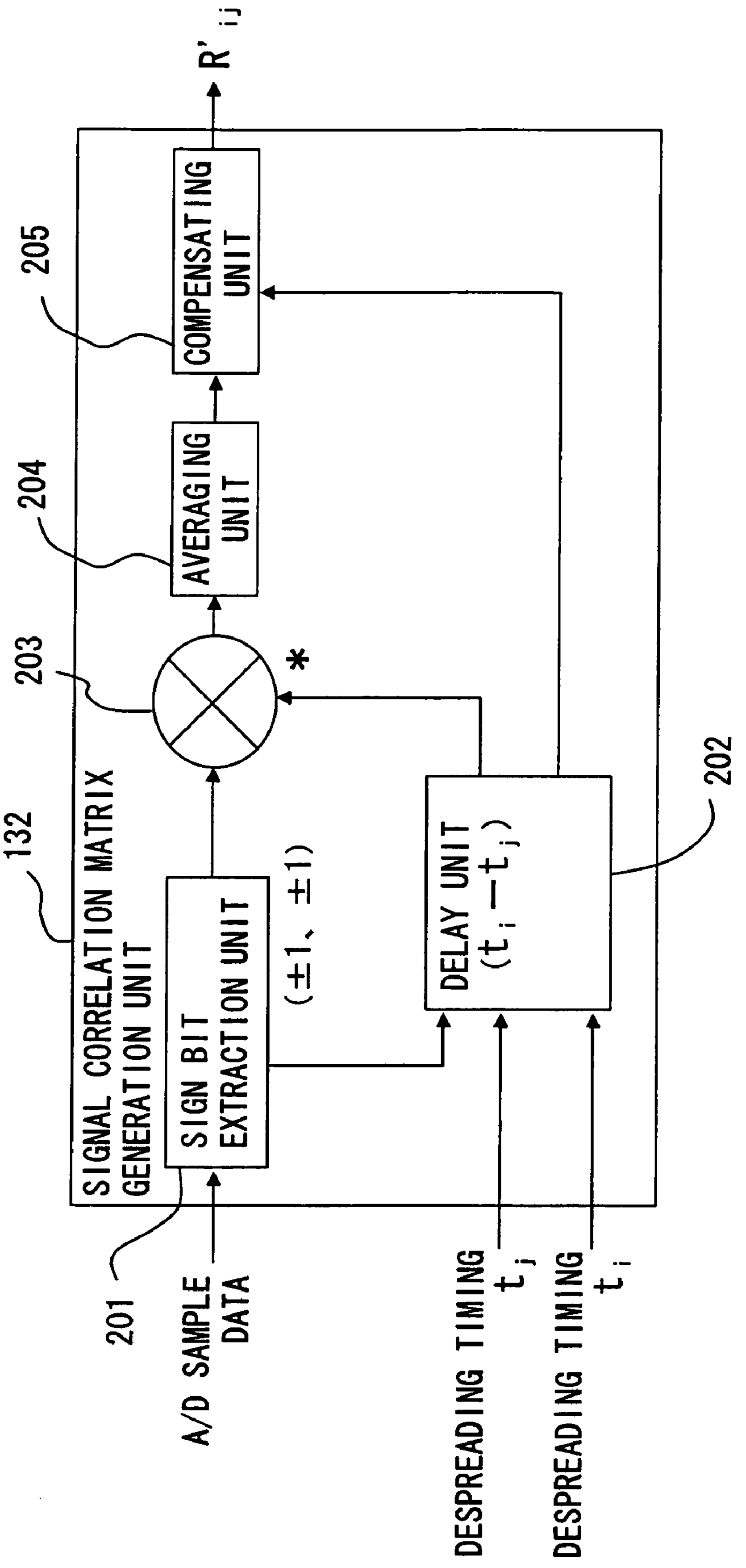
FIG. 11 is a diagram showing an example of a detailed circuit configuration of the signal correlation matrix generation unit in a second embodiment.

FIG. 11 is a diagram showing an example of a detailed circuit configuration of the signal correlation matrix generation unit 132 in the weight generation unit 107 in FIG. 3. As illustrated in FIG. 11, the signal correlation matrix generation unit 132 includes a sign bit extraction unit 201, a delay unit 202, a multiplier 203, an averaging unit 204 and a compensating unit 205. The signal correlation matrix generation unit 132, in the same way as in the first embodiment, receives the sample data (received data) from the A/D converting unit 104 and receives inputs of the despreading timing $t_i$ and the despreading timing $t_j$, which correspond to the signal correlation matrix generation unit 132 itself, from the timing generation unit 105, and outputs the elements $R'_{ij}$ of the signal correlation matrix.

The sign bit extraction unit 201 sequentially extracts a real part and an imaginary part of the sign bit with respect to the data peripheral to the despreading timing $t_1$ in the sample data inputted from the A/D converting unit 104. The sign bit to be extracted is, e.g., a most significant bit (MSB) of the target data. The reason why the bit to be extracted is targeted at the sign bit is that the sign bit is information considered strong of the correlation occurred in the digital signal. The extracted sign bit is sent sequentially to the multiplier 203 and the delay unit 202. Note that the bit extracted by the sign bit extraction unit 201 is not limited to only the sign bit, and a plurality of bits including the sign bit may also be extracted. Hereafter, a signal outputted from the sign bit extraction unit 201 will be referred to as a sign bit signal (or a sign bit (±1) of the real part, a sign bit (÷1) of the imaginary part).

The delay unit 202 gives a delay of a time difference (which will hereinafter be termed a timing difference) between the despreading timing $t_i$ and the despreading timing $t_j$, to the sign bit signal peripheral to the despreading timing $t_i$ outputted from the sign bit extraction unit 201. Further, the delay unit 202 transfers the timing difference between the despreading timing $t_i$ and the despreading timing $t_j$ to the compensating unit 205.

The multiplier 203 obtains a product of the sign bit signal peripheral to the despreading timing $t_i$ outputted from the sign bit extraction unit 201 and the sign bit signal, of which a complex conjugate is taken, given the delay outputted from the delay unit 202. The averaging unit 204 averages the signals outputted from the multiplier 203 and transfers the averaged signal to the compensating unit 205. The signal outputted from the averaging unit 204 will hereinafter be referred to as a sign bit correlation signal. It is to be noted that this sign bit correlation signal may also be set as an output of the signal correlation matrix generation unit 132, i.e., the element $R'_{ij}$ of the signal correlation matrix.

The compensating unit 205 executes predetermined compensation of the sign bit correlation signal in order to make higher the accuracy of the signal correlation matrix generated by use of only the sign bit. The compensating unit 205, when judging that the timing difference sent from the delay unit 202 is smaller than a predetermined threshold value, performs the compensation. For instance, one-chip time is used as this predetermined threshold value. The compensating unit 205, when judging that the timing difference is within the one-chip time, executes the following compensation process. According to the judgment as to whether the compensation is needed or not, it follows that a diagonal component of the signal correlation matrix $R'_{ij}$ is invariably compensated because of the timing difference being zero due to an autocorrelation.

The compensating unit 205, when judging that the compensation is needed, calculates a compensation coefficient based on a compensation function F(|s|) shown in the following Formula (11) from the inputted sign bit correlation signal, and multiplies this calculated compensation coefficient by the original inputted sign bit correlation signal, thereby executing the compensation. The sign bit correlation signal inputted to the compensating unit 205 is designated by s in the Formula (11). Namely, the compensation coefficient is obtained, based on the compensation function F(x), from an absolute value of the sign bit correlation signal. "erf( )" shown in the Formula (12) is an error function and is expressed as by the Formula (13).

[Mathematical Expression 8]

$$F(|s|) = \frac{0.65\, f^{-1}(|s|)}{|s|} \quad \text{Formula (11)}$$

$$f(x) = \frac{2}{\sqrt{\pi}} \int_0^{\infty} \left\{ \mathrm{erf}\left( \sqrt{\frac{x}{1-x}} \cdot t \right) \right\}^2 e^{-t^2}\, dt \quad \text{Formula (12)}$$

$$\mathrm{erf}(x) = \frac{2}{\sqrt{\pi}} \int_0^{x} e^{-t^2}\, dt \quad \text{Formula (13)}$$

Figure 12:
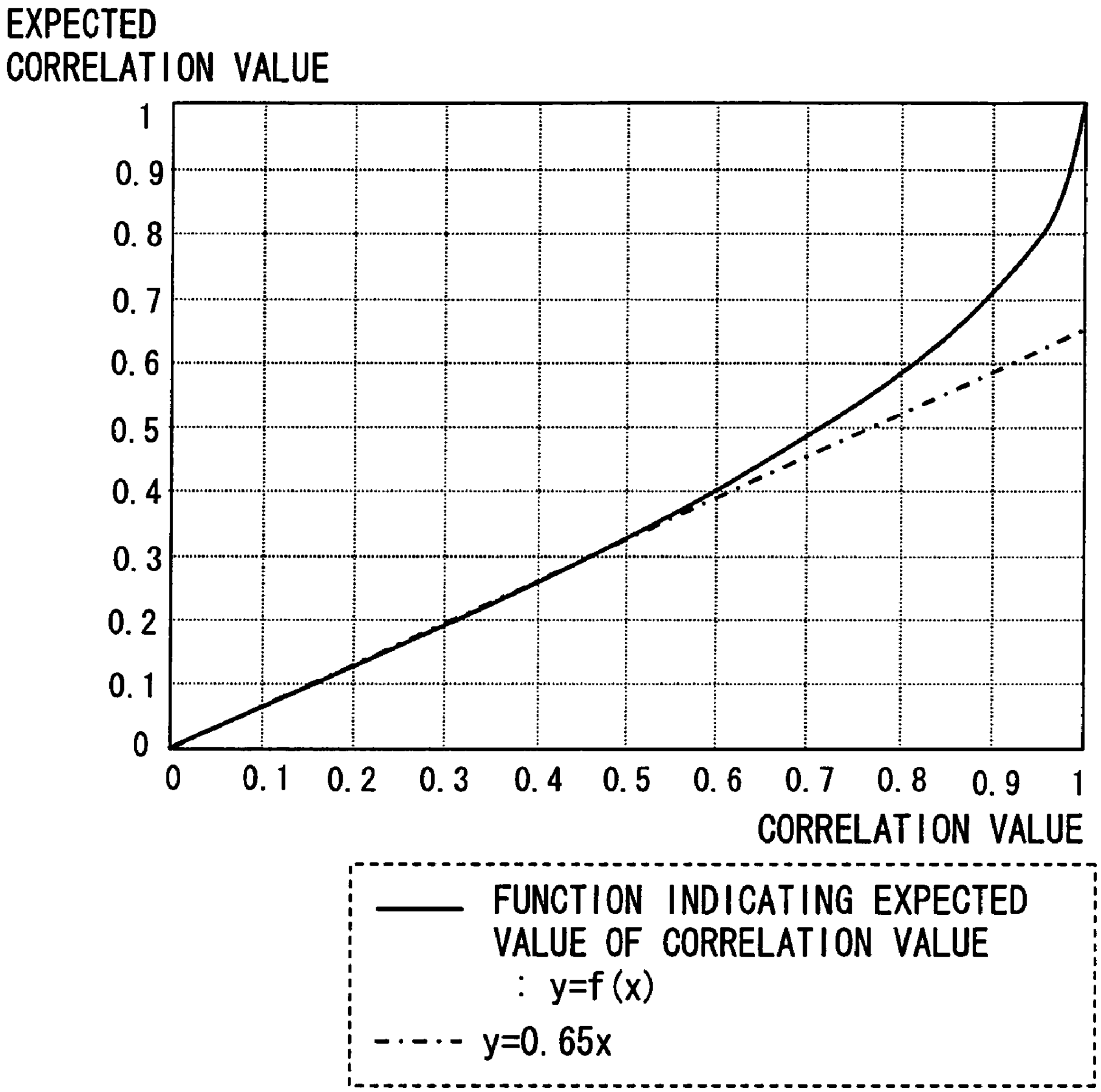
FIG. 12 is a graph showing a relationship between a signal correlation value and an expected value of the signal correlation value.

A basis of the compensation function F(x) will be explained with reference to FIG. 12. FIG. 12 is a graph showing a relationship between a signal correlation value and an expected value of this signal correlation value in the case of using the sign bit.

On the occasion of selecting the compensation function F(x), there is conducted an analysis calculation about a characteristic of the correlation value in the case of using the sign bit signal directly as the element of the signal correlation matrix. On the occasion of this analysis, when considering input signals $x_1$ and $x_2$ according to a Gaussian distribution of an average value "0" (zero), the input signals $x_1$ and $x_2$ can be modelized in the following Formula (14), where $\sigma^2$ is the variance of these input signals, and c is the correlation therebetween.

[Mathematical Expression 9]

$$x_1 = \sqrt{c\sigma^2} \cdot n_1 + \sqrt{(1-c)\sigma^2} \cdot n_2 \quad \text{Formula (14)}$$
$$x_2 = \sqrt{c\sigma^2} \cdot n_1 + \sqrt{(1-c)\sigma^2} \cdot n_3$$

Herein, $n_1$, $n_2$ and $n_3$ are independent Gaussian noise variables of the variance 1. When using the sign bits of $x_1$ and $x_2$, an expected correlation value can be obtained from a probability that $x_1$ and $x_2$ have the same code, and can be expressed as by the following Formula (15).

[Mathematical Expression]

$$E(\mathrm{sign}(x_1)\mathrm{sign}(x_2)) = \frac{2}{\sqrt{\pi}} \int_0^{\infty} \left\{ \mathrm{erf}\left( \sqrt{\frac{c}{1-c}} \cdot t \right) \right\}^2 e^{-t^2}\, dt \quad \text{Formula (15)}$$

In this Formula (15), sign(x)=x/|x|. This expected value given as a function of the correlation value c is f(x) shown in FIG. 12. As shown in FIG. 12, when the correlation value c is smaller than 0.5, it is understood that the expected value of the sign bit correlation is substantially proportional to the correlation value c (which is coincident with a proportional straight line y=0.65x shown in FIG. 12). Whereas if the compensation value c is larger than 0.5, the expected value of the sign bit correlation deviates from the proportional straight line and gets large, and, when the correlation value is "1", the expected value of the sign bit correlation becomes "1". Normally, the value of the auto-correlation of the multi-path signal is smaller than 0.25 in many cases, and hence it is recognized that the majority of elements of the signal correlation matrix using the sign bit are proportional to the true correlation value c.

Accordingly, with respect to an area where the expected value deviates from the proportional straight line, i.e., with respect to the area corresponding to the diagonal component of the signal correlation matrix, the compensation for getting the expected value approximate to the proportional straight line is executed (the compensation is executed to make relatively small the diagonal component of the signal correlation matrix), whereby the signal correlation matrix based on the sign bit can be, it is recognizable, set to a constant-multiple of the true correlation matrix.

Herein, when considering a compensation coefficient A for making the expected value y=f(x) of the signal correlation matrix shown in FIG. 12 approximate to the proportional straight line y=0.65x, this compensation coefficient A can be expressed as by the following Formula (16), wherein the compensation function F(x) in the Formula (11) is resultantly obtained. Further, if the signal correlation value is small, it is understood that this compensation is not required. In this case, the compensating unit 205 may not perform the compensation if the value of the sign bit correlation signal to be inputted is small.

[Mathematical Expression 11]

$$yA = 0.65x \quad \text{Formula (16)}$$
$$A = \frac{0.65x}{y} = \frac{0.65 f^{-1}(y)}{y}$$

<Operation and Effect in Second Embodiment>

An operation and an effect of the CDMA transceiver device in the second embodiment discussed so far will be explained.

The radio signal received by the antenna 101 is demodulated in the wireless receiving unit 103 via the duplexer 102, and the demodulated signal is converted into the digital signal (sample data) in the A/D converting unit 104. This sample data is supplied to the timing generation unit 105 and to the despreading unit 106, wherein each of the plural fingers within the despreading unit 106 performs despreading according to the predetermined despreading timings (the RAKE timings and the MICT timings) generated by the timing generation unit 105.

The sample data of the A/D converting unit 104 and the timings of the timing generation unit 105 are supplied also to the weight generation unit 107, wherein the weight corresponding to each of the fingers of the despreading unit 106 is generated.

Sent to the signal processing unit 108 are the despreading output signal outputted from each of the fingers within the despreading unit 106 and the weight corresponding to each of the fingers, which is outputted from the weight generation unit 107. The signal processing unit 108 multiplies the despreading output signal corresponding to each finger by the weight corresponding to this finger, thereby combining the respective multiplied signals. Then, this combined signal undergoes channel decoding etc by the signal processing unit 108 and is thus turned to be the reception data.

On the other hand, the despreading output signal outputted from the despreading unit 106 is supplied to the level measuring unit 110, then the feedback control is applied to the signal combining unit 108 in accordance with the signal level, and the transmission power of the wireless transmission unit 111, which modulates the transmission data and transmits the modulated transmission data via the duplexer 102 and the antenna 101, is controlled.

In the weight generation unit 107, for generating the weight, at first, the channel estimation unit 131 executes the channel estimation based on the despreading timings (the RAKE timings and the MICT timings) given from the timing generation unit 105 and the sample data given from the A/D converting unit 104, and generates the channel response vector h having, as an element, the channel estimation value at each despreading timing. Moreover, the signal correlation matrix generation unit 132 obtains the signal correlation matrix R' based on the timings given from the timing generation unit 105 and the sample data given from the A/D converting unit 104. Then, the multiplying unit 133 multiplies the channel response vector h by the inverse matrix of the signal correlation matrix R', thereby generating each of the weights w corresponding to the respective fingers within the despreading unit 106.

In the second embodiment, the signal correlation matrix generation unit 132 in this weight generation unit 107 takes a different configuration from that in the first embodiment. The signal correlation matrix generation units 132 are provided corresponding to the number of the should-be-outputted elements of the signal correlation matrix.

In the signal correlation matrix generation unit 132 according to the second embodiment, the sign bits on each of the real part and of the imaginary part are sequentially extracted, by the sign bit extraction unit 201, from the sample data inputted from the A/D converting unit 104 about peripheral to the despreading timing $t_i$ and are transmitted as the sign bit signal to the delay unit 202 and to the multiplier 203.

The sign bit signal inputted to the delay unit 202 is given a delay of the timing difference between the despreading timing $t_i$ and the despreading timing $t_j$. Then, the multiplier 203 multiplies the sign bit signal peripheral to the despreading timing $t_i$ before being delayed by the signal given the delay, of which the complex conjugate is taken, and the averaging unit 204 averages the multiplied signal (sign bit correlation signal).

The compensating unit 205, if the timing difference sent from the delay unit 202 is smaller than a predetermined threshold value, corrects the sign bit correlation signal outputted from the averaging unit 204. This compensation is performed in a way that multiplies the sign bit correlation signal by the compensation coefficient obtained based on the compensation function F(x) from the absolute value of the sign bit correlation signal. Then, the signal outputted from the compensating unit 205 is used as the element of the signal correlation matrix.

Thus, in the second embodiment, the sign bit correlation matrix used for obtaining the weight is generated based on only the sign bit of the received signal. Since this may be attained by the simple code inverting process, according to the second embodiment, the arithmetic quantity can be thereby greatly reduced as compared with generating the signal correlation matrix in the first embodiment, and more essentially the high-speed interference reducing process can be actualized. It should be noted that the method in the second embodiment enables the arithmetic quantity to be decreased down to approximately one-tenth of the arithmetic quantity in the first embodiment.

Further, according to the second embodiment, it is possible to acquire the same high signal characteristic as in the first embodiment as well as to actualize the high-speed processing.

Figure 13:
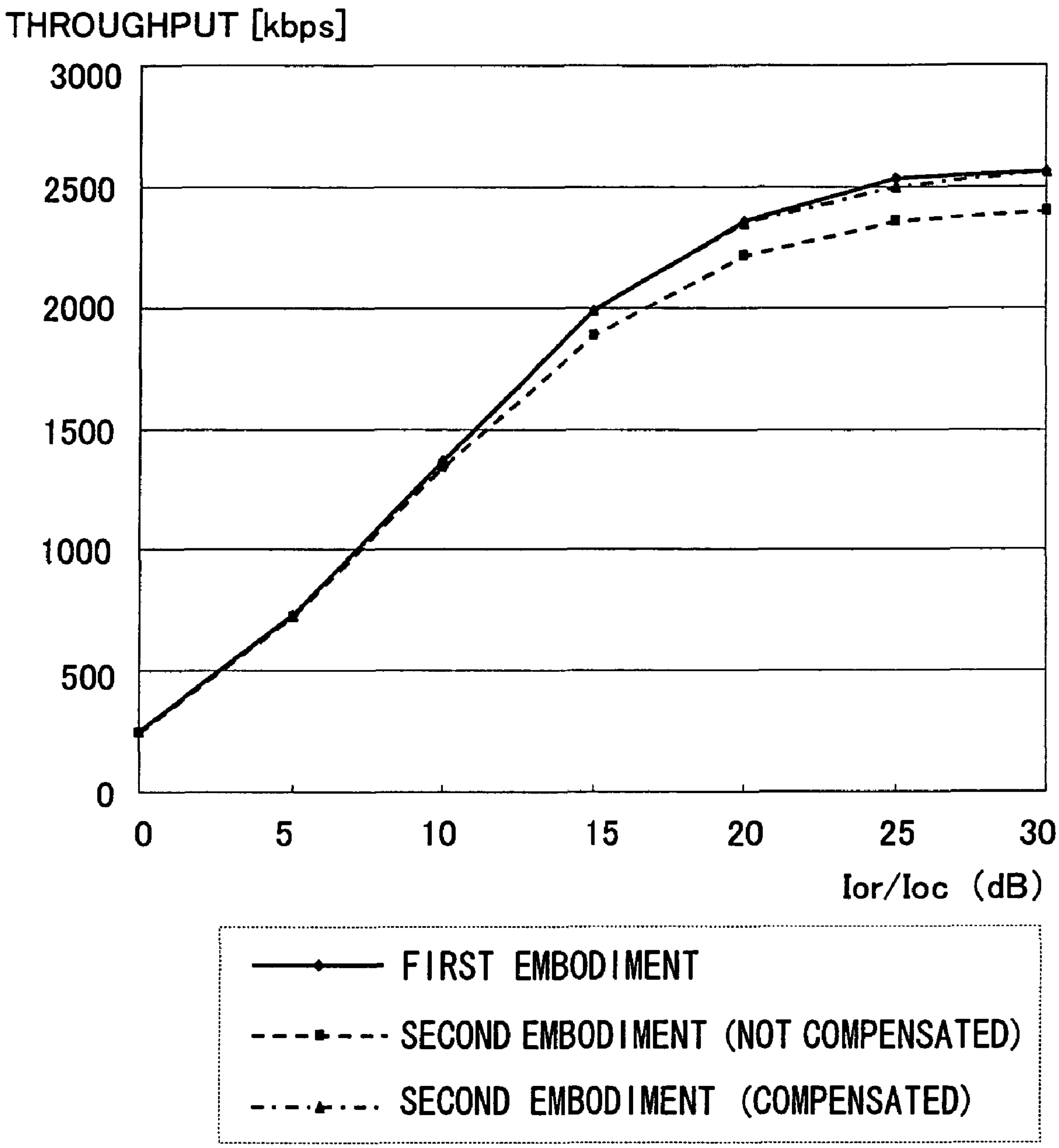
FIG. 13 is a graph showing a signal characteristic based on each weight generation method.

FIG. 13 shows a result of actually proving this effect. FIG. 13 is a graph showing the signal characteristic based on each weight generation method, wherein the axis of ordinate indicates a throughput, and the axis of abscissa indicates reception all-power/noise power. FIG. 13 shows the signal characteristic in the case of generating the signal correlation matrix by use of all the information of the sample data by way of [the first embodiment], the signal characteristic in the case of generating the signal correlation matrix by using the sign bit in the sample data and executing none of the compensation process by the compensating unit 205 by way of [the second embodiment (not compensated)], and the signal characteristic in the second embodiment (in the case of generating the signal correlation matrix by using the sign bit in the sample data and executing the compensation process by the compensating unit 205) by way of [the second embodiment (compensated)].

As shown in FIG. 13, if not compensated by the compensating unit 205, deterioration of the signal characteristic is more or less seen, however, as in the second embodiment discussed above, if compensated by the compensating unit 205, it is recognized that the same signal characteristic as in the first embodiment is acquired.

Modified Example of Second Embodiment

In the signal correlation matrix generation unit 132 in the second embodiment described above, the compensating unit 205 judges the execution and non-execution of the compensation in accordance with a magnitude of the timing difference of the despreading that is sent from the delay unit 202, however, if the timing difference is assured large enough not to require the compensation, the compensating unit 205 is provided in only the signal correlation matrix generation unit 132 that generates the diagonal component of the signal correlation matrix, while the signal correlation matrix generation units 132 generating the elements other than the diagonal component may not be provided with the compensating units 205.

Further, the compensating unit 205 previously determines a constant corresponding to the timing difference as a substitute for the compensation function F(x) in the formula (11), and may execute the compensation by using this constant. In this case, specifically, the compensating unit 205, when receiving the timing difference sent from the delay unit 202, obtains a sample time count contained in this timing difference, and extracts a predetermined coefficient by referring to a compensation coefficient table stored in a memory etc based on this sample time count. FIG. 14 shows the example of the compensation coefficient table in a case where a sampling rate is 4 times as large as a data rate. The compensating unit 205 may also perform the compensation in a way that multiplies the extracted coefficient by the sign bit correlation signal outputted from the averaging unit 204.

Third Embodiment

The CDMA transceiver device in a third embodiment of the present invention will hereinafter be described. The CDMA transceiver device in the second embodiment explained earlier has been described by way of the embodiment suited to the case of providing one single transceiver antenna. The third embodiment is an embodiment suited to a case of providing a plurality of transceiver antennas in a mode of generating the signal correlation matrix by using only the sign bit of the received signal in the second embodiment.

[Device Configuration]

Figure 15:
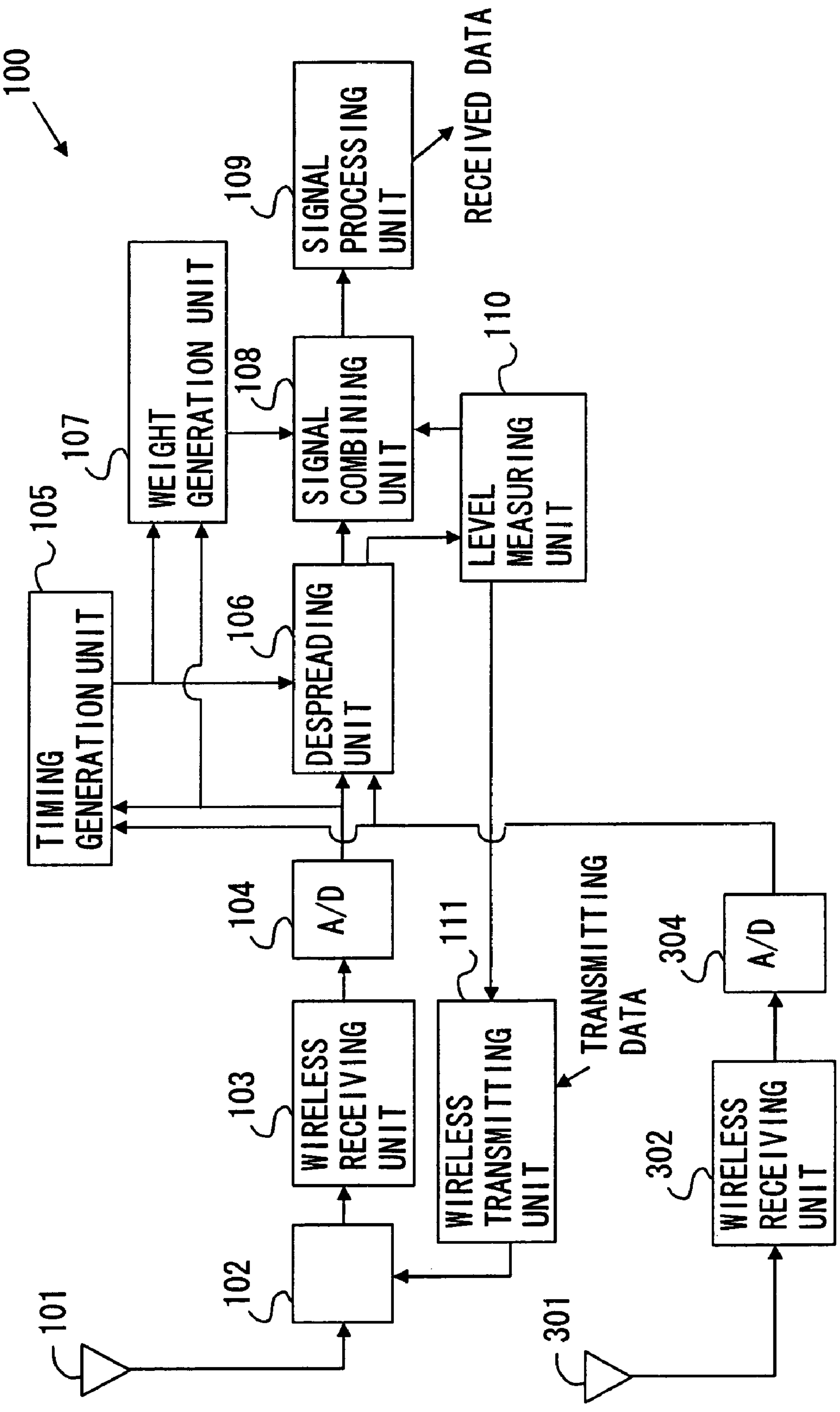
FIG. 15 is a diagram showing an example of a circuit configuration of the CDMA transceiver device in a third embodiment.

The CDMA transceiver device in the third embodiment includes functional units corresponding to the antennas from the second onward in addition to the functional units provided in the CDMA transceiver device in the second embodiment. FIG. 15 is a diagram showing an example of the circuit configuration of the CDMA transceiver device in the third embodiment. As illustrated in FIG. 15, a configuration of the third embodiment differs from that of the second embodiment in that the third embodiment has further a wireless receiving unit 302 and an A/D converting unit 304 corresponding to a second antenna 301. In FIG. 15, though only the second antenna is illustrated, in the case of further providing more antennas, the wireless receiving units and the A/D converting units may be increased corresponding to the respective antennas.

The functions of the wireless receiving unit 302 and the A/D converting unit 304 are the same as those of the wireless receiving unit 103 and the A/D converting unit 104 that correspond to the first antenna 101, and hence their explanations are omitted. Note that the digital signal outputted from the A/D converting unit 304 is transmitted together with signals received by other antennas to the despreading unit 106, the timing generation unit 105 and the weight generation unit 107, respectively. In the discussion that is made hereafter, two pieces of antennas among the plurality of antennas or the signals received by these two antennas are designated by [ANT#m], [ANT#n].

<Detailed Configurations of Timing Generation Unit, Despreading Unit and Signal Combining Unit>

Figure 16:
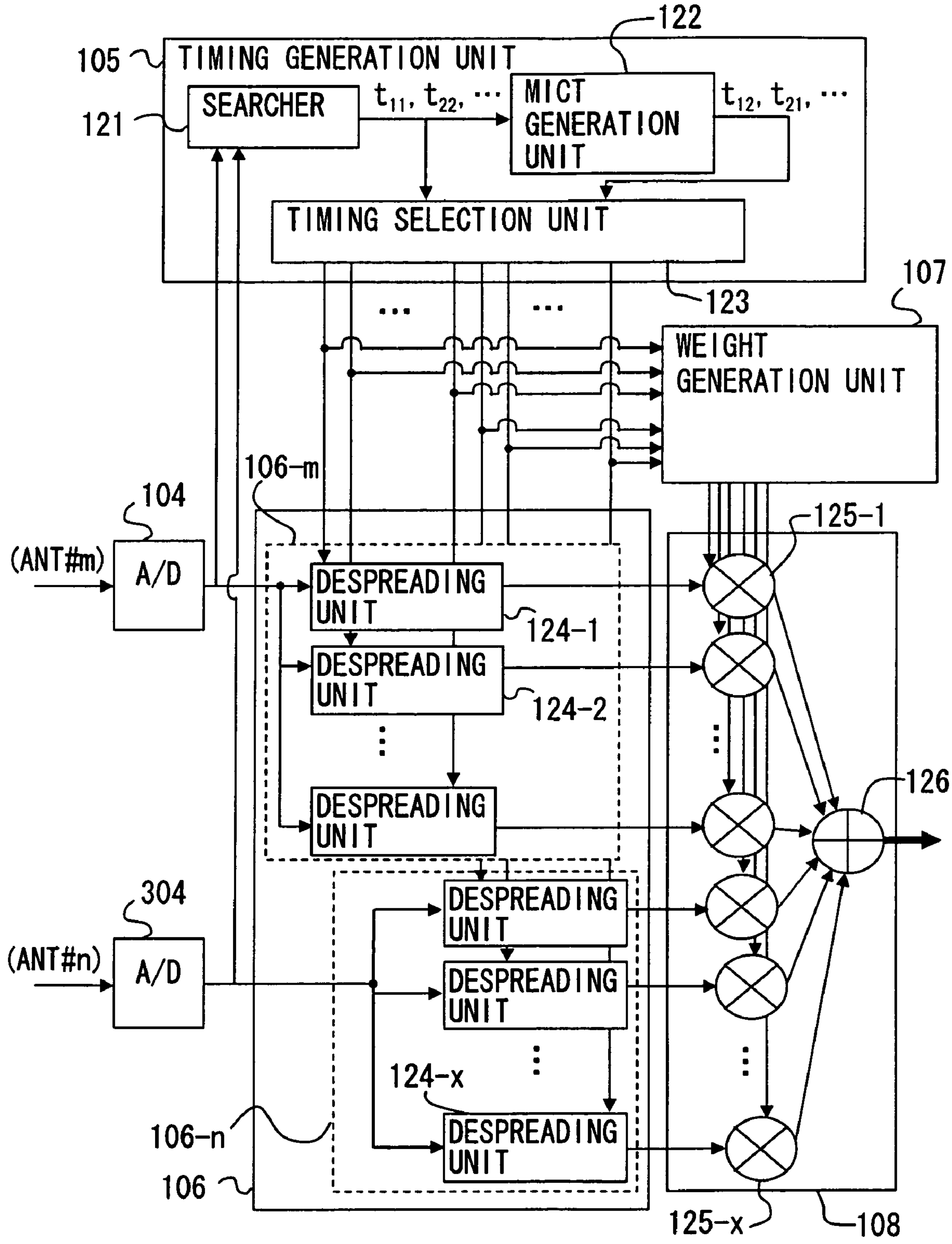
FIG. 16 is a diagram showing an example of detailed circuit configurations of the timing generation unit, the despreading unit and the signal combining unit in the third embodiment.

FIG. 16 is a diagram showing an example of detailed circuit configurations of the timing generation unit 105, the despreading unit 106 and the signal combining unit 108 in FIG. 15.

As shown in FIG. 16, the timing generation unit 105 includes, in the same way as in the second embodiment, the searcher 121, the MICT generation unit 122 and the timing selection unit 123. The timing generation unit 105 receives the digital signals into which the individual signals received respectively by the plurality of antennas are converted by the A/D converting unit 104 (304), and generates the predetermined despreading timing with respect to each of the signals. Note that the method of generating the despreading timing with respect to each signal is the same as the method in the second embodiment.

Namely, the timing generation unit 105, it follows, selects the proper timings from the RAKE timings and the MICT timings for the respective digital signals corresponding to the received signals received by the respective antennas. It is to be noted that if a delay profile about each of the digital signals is not so different depending on a position of installing each of the antennas, the despreading timing may also be generated by using the received signal of one single antenna.

The despreading unit 106 has a group of plural fingers **106-*m* corresponding to the antenna #m and a group of plural fingers 106-*n* corresponding to the antenna #n. Each finger group includes a plurality of despreading units 124-1, 124-2. The respective despreading units 124-1 to 124-*x* receive the digital signals via the corresponding antenna, and despread these digital signals at the timings transferred from the timing generation unit 105**. The detailed function of each spreading unit is the same as in the second embodiment.

The signal combining unit 108 multiplies the despread outputs outputted from the respective despreading units by the weights transferred corresponding to the respective fingers from the weight generation unit 107 (multipliers 125-1 to **125-*x*), and adds up these multiplied values (an adder 126). It is to be noted that the function of the signal combining unit 108** is the same as in the second embodiment except that the number of the multipliers increases.

<Detailed Configuration of Weight Generation Unit>

Figure 17:
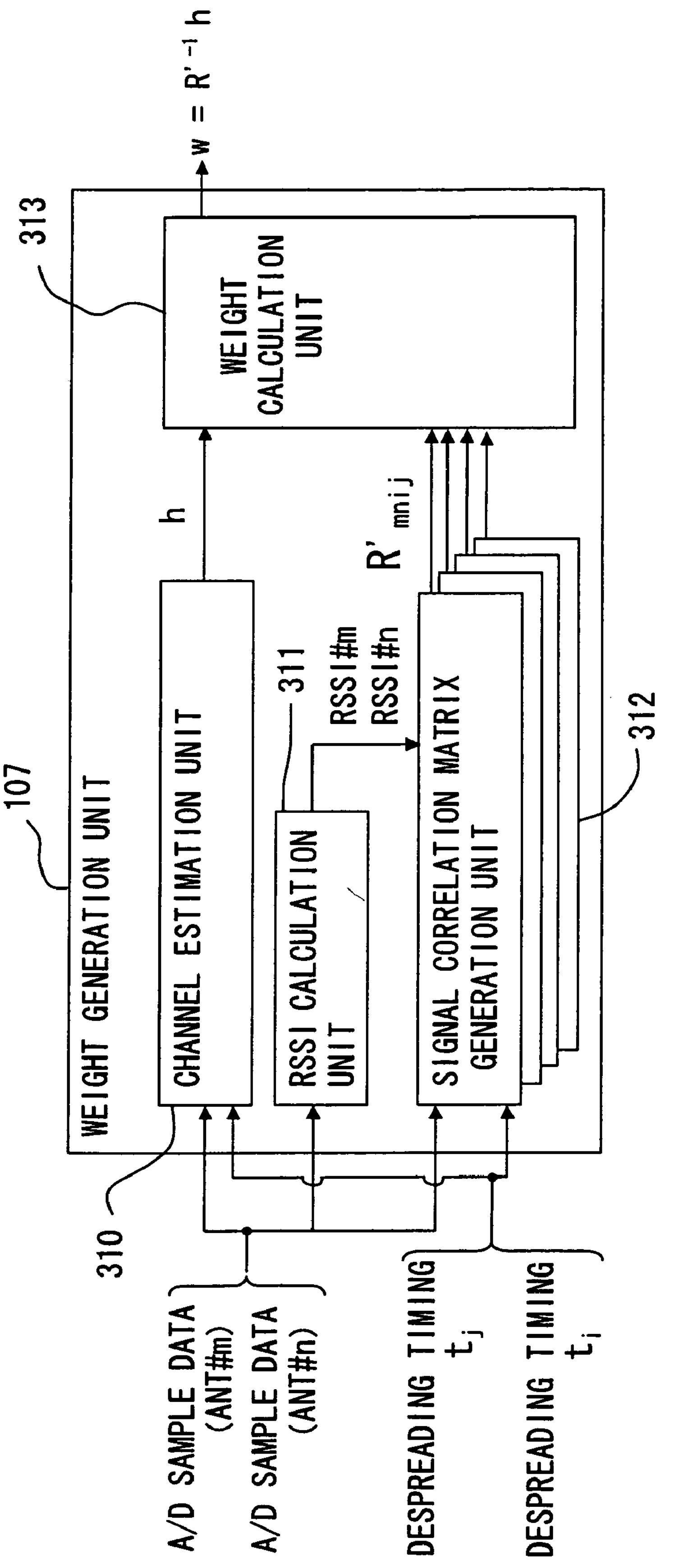
FIG. 17 is a diagram showing an example of a detailed circuit configuration of the weight generation unit in the third embodiment.

FIG. 17 is a diagram showing an example of a detailed circuit configuration of the weight generation unit 107 in FIG. 15. As illustrated in FIG. 17, the weight generation unit 107 includes a channel estimation unit 310, a receive signal strength indication (which will hereinafter be abbreviated to RSSI) calculation unit 311, a signal correlation matrix generation unit 312 and a weight calculation unit 313.

The channel estimation unit 310 generates the channel response vector h by performing the channel estimation based on the timings given from the timing generation unit 105 and the sample data (the digital signals of the signals received via the antennas #m and #n) given from the A/D converting unit 104. At this time, the channel response vector h generated by the channel estimation unit 310 comes to have, as the element, the channel estimation value at each despreading timing with respect to each of the antennas #m and #n.

The RSSI calculation unit 311 receives the respective pieces of sample data into which the received signals via the antennas #m and #n are A/D-converted, and calculates the RSSI corresponding to each antenna. Herein, RSSI#m represents the RSSI corresponding to the antenna #m, and RSSI#n represents the RSSI corresponding to the antenna #n. The thus calculated RSSI#m and RSSI#n are transferred to the signal correlation matrix generation unit 312.

The signal correlation matrix generation units 312 are provided corresponding to the number of the should-be-outputted elements of the signal correlation matrix, i.e., corresponding to a value obtained by multiplying the number of the antennas by the number of the despreading timings. The signal correlation matrix generation units 312 have no necessity of being provided corresponding to the number of the elements but may also be configured in one signal circuit.

Each signal correlation matrix generation unit 312 receives any one of the despreading timings $t_i$, the despreading timing $t_j$ (including a case of i=j) used for giving the delay difference, the sample data of the antenna #m in the vicinity of the despreading timing $t_i$, the sample data of the antenna #n (including a case of n=m) in the vicinity of the despreading timing $t_i$, the RSSI#m of the antenna #m and the RSSI#n (including the case of n=m) of the antenna #n. The signal correlation matrix generation unit 312 obtains an element $R'_{mnij}$ of the signal correlation matrix based on these items of information.

The weight calculation unit 313 obtains an inverse matrix $R'^{-1}$ of the signal correlation matrix R' generated by the signal correlation matrix generation unit 312, and generates the weight w corresponding to each timing in a way that multiplies the inverse matrix $R'^{-1}$ by the channel response vector h generated by the channel estimation unit 310.

<Detailed Configuration of Signal Correlation Matrix Generation Unit>

Figure 18:
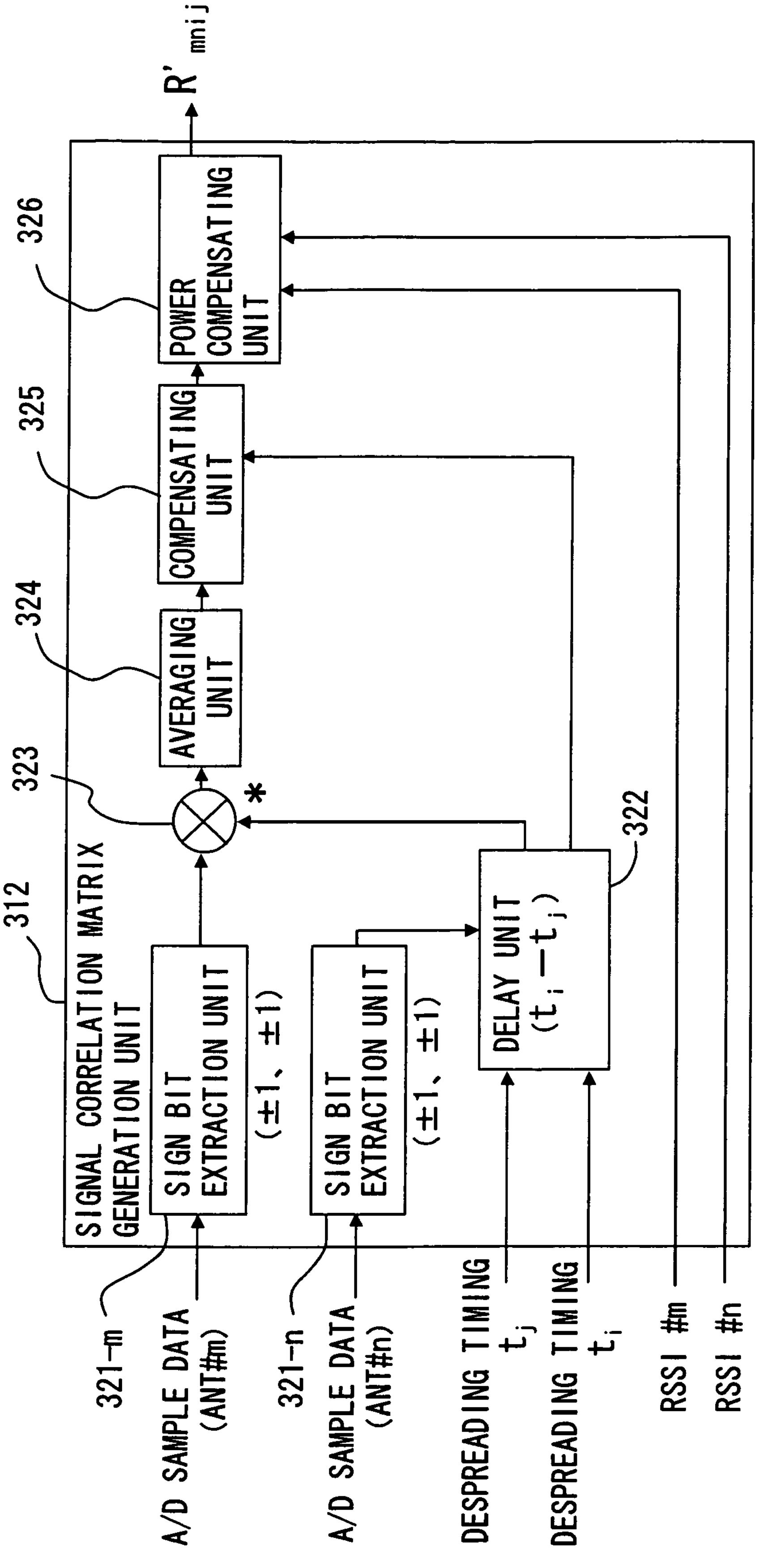
FIG. 18 is a diagram showing an example of a detailed circuit configuration of the signal correlation matrix generation unit in the third embodiment.
Figure 20:
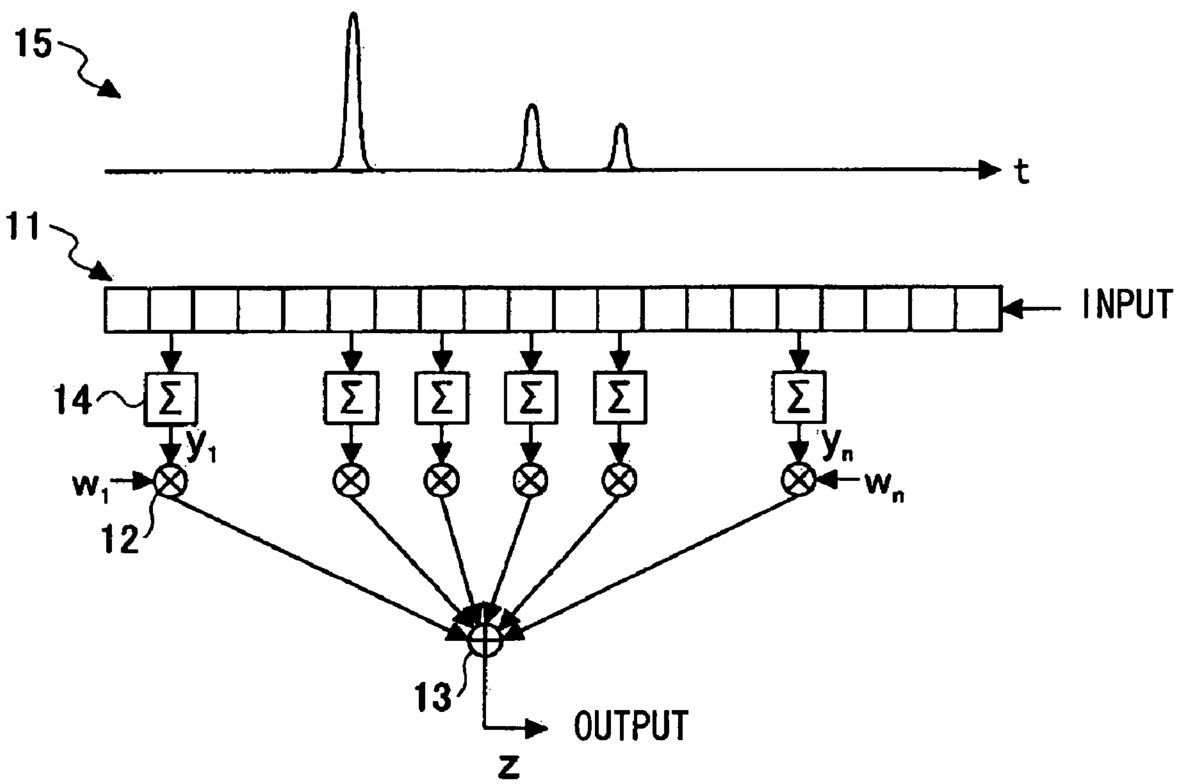
FIG. 20 is a diagram showing an outline of a conventional G-RAKE receiver.
Figure 21:
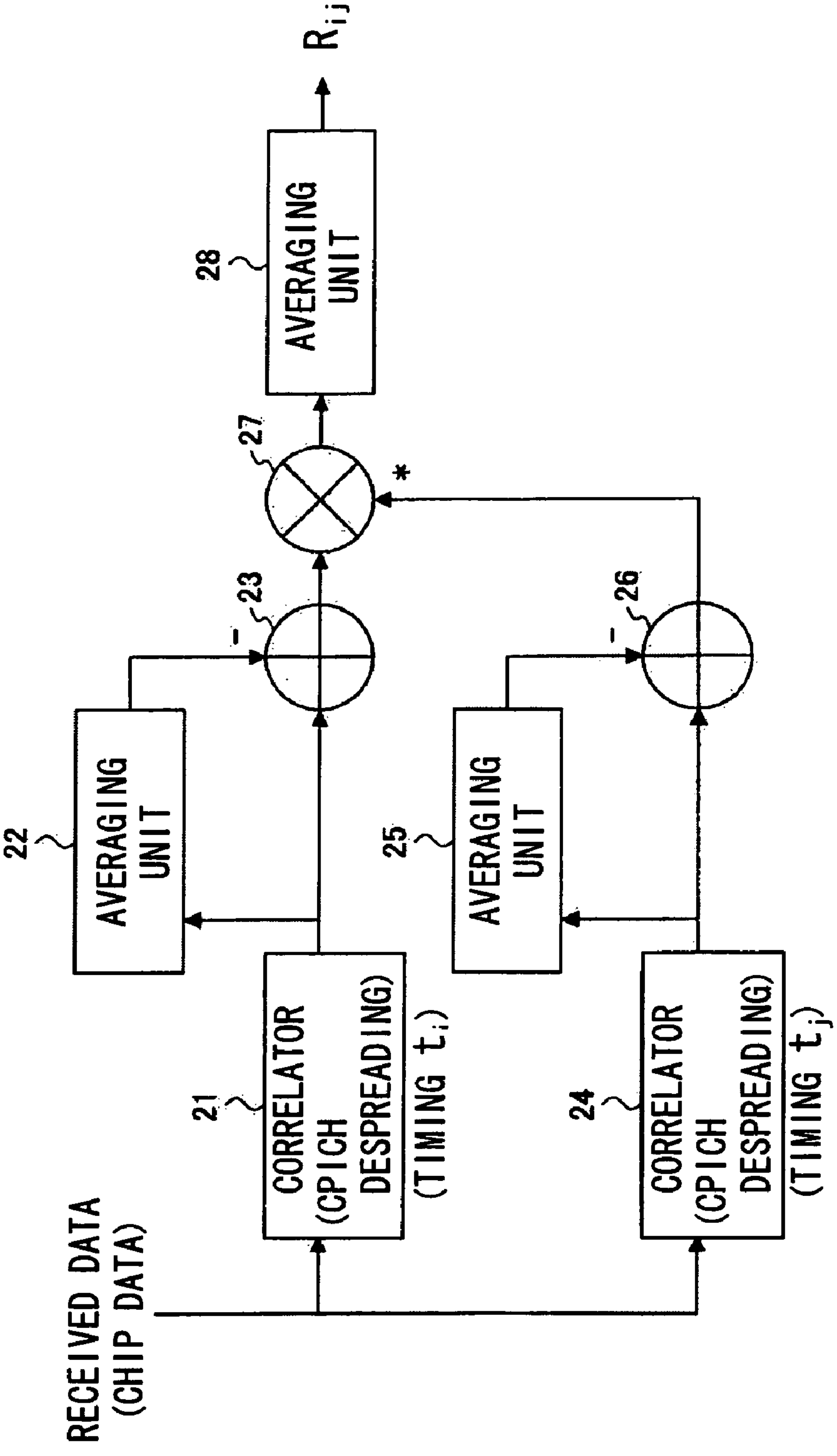
FIG. 21 is a diagram showing an example of a circuit configuration for obtaining elements of a covariance matrix in the conventional G-RAKE receiver.

FIG. 18 is a diagram showing an example of a detailed circuit configuration of the signal correlation matrix generation unit 312. As illustrated in FIG. 18, the signal correlation matrix generation unit 312 includes a sign bit extraction unit 321-*m*, a sign bit extraction unit 321-*n*, a delay unit 322, a multiplier 323, an averaging unit 324, a compensating unit 325 and a power compensating unit 326.

In the signal correlation matrix generation unit 312, the sample data of the antenna #m in the vicinity of the despreading timing $t_i$ is inputted to the sign bit extraction unit 321-*m*, and the sample data of the antenna #n (including the case of n=m) in the vicinity of the despreading timing $t_i$ is inputted to the sign bit extraction unit 321-*n*. Further, the despreading timing $t_i$ and the despreading timing $t_j$ (including a case of i=j) used for giving the delay difference are inputted to the delay unit 322. Moreover, RSSI#m corresponding to the antenna #m and RSSI#n corresponding to the antenna #n, which are transmitted from the RSSI calculation unit 311, are respectively inputted to the power compensating unit 326.

The function itself of each of the sign bit extraction units 321-*m* and 321-*n* is the same as that of the sign bit extraction unit 201 in the second embodiment. The sign bit extraction unit 321-*m* extracts each sign bit of the real part and the imaginary part of the inputted sample data corresponding to the antenna #m, and sends the sign bits to the multiplier 323. The sign bit extraction unit 321-*n* extracts each sign bit of the real part and the imaginary part of the inputted sample data corresponding to the antenna #n, and sends the sign bits to the delay unit 322. At this time, the sample data inputted to the sign bit extraction units 321*m* and 321-*n* are each the data in the vicinity of the despreading timing $t_i$.

The delay unit 322 gives a delay of a time difference (which will hereinafter be termed a timing difference) between the despreading timing $t_i$ and the despreading timing $t_j$, to the sign bit signal corresponding to the antenna #n, which is outputted from the sign bit extraction unit 321-*n*. Further, the delay unit 322 transfers the timing difference to the compensating unit 325. It is to be noted that if the despreading timings to be inputted are the same (the case of i=j), it follows that the sign bit signal given none of the delay is transmitted to the multiplier 323.

The multiplier 323 obtains a product of the sign bit signal corresponding to the antenna #m that is outputted from the sign bit extraction unit 321-*m* and the sign bit signal corresponding to the antenna #n, of which the complex conjugate is taken, given a delay outputted from the delay unit 322. The multiplied sign bit signals are transferred to the averaging unit 324. The averaging unit 324 averages the signals outputted from the multiplier 323, and transfers a sign bit correlation signal thereof to the compensating unit 325. It is to be noted that this sign bit correlation signal may also be set directly as the output of the signal correlation matrix generation unit 312, i.e., the element $R'_{mnij}$ of the signal correlation matrix.

The compensating unit 325 executes predetermined compensation of the sign bit correlation signal in order to make higher the accuracy of the signal correlation matrix generated by use of only the sign bit. The correcting method by the compensating unit 325 is the same as in the second embodiment, and hence its explanation is omitted. In the third embodiment, the number of the elements of the signal correlation matrix generated increases by a multiple of the number of the antennas as compared with the second embodiment, however, there shall be no change about a point that the compensation by the compensating unit 325 is done with respect to such an element that the timing difference is smaller than the predetermined threshold value. Accordingly, it follows that the compensating unit 325 in the third embodiment makes the compensation about at least the signal correlation value generated by the signal correlation matrix generation unit 312, wherein the sample data inputted are the data with respect to the same antenna (m=n), and the despreading timings inputted are the same timings (i=j), or alternatively, the sample data inputted are the data about the different antenna (m≠n), and the despreading timings inputted are the same timings (i=j).

Further, the compensation by the compensating unit 325 may involve using the method in the modified example of the second embodiment. Namely, the compensating unit 325 previously determines, corresponding to the timing difference, the constant (a compensation coefficient table) as a substitute for the compensation function F(x) in the Formula (11), and makes the compensation by use of this compensation coefficient table. FIG. 19 shows an example of the compensation coefficient table used in this case.

The power compensating unit 326 further makes the compensation about the sign bit correlation signal compensated by the compensating unit 325. This intends to correct a quantize error that was not treated as a problem in the device configured to have one antenna as in the second embodiment. It is known that the sign bit correlation signal has an RSSI multiplication difference from the signal correlation signal using all the data in the first embodiment, this does not cause any problem because of being RSSI multiplication simply as the data on the whole in the case of the single antenna, however, influence of a power difference occurs in the case of targeting at the plurality of antennas, and the above compensation intends to compensate this influence.

Accordingly, the power compensating unit 326 corrects the sign bit correlation signal on the basis of RSSI#m of the antenna #m and RSSI#n (including the case of n=m) of the antenna #n. On the occasion of executing this compensation, the power compensating unit 326 multiplies RSSI#m and RSSI#n, and further multiplies the sign bit correlation signal by a value obtained from extraction of the square root of the multiplied RSSI. This makes it possible to cancel the quantize error (RSSI multiplication) contained in the sign bit correlation signal.

The following Formula (17) shows the compensation in the power compensating unit 326. "<x1, x2*>" in this Formula represents the data equivalent to the signal correlation value in the first embodiment.

[Formula 12]

$$\frac{<x_1 \cdot x_2^*>}{\sqrt{(RSSI\#m)(RSSI\#n)}} \cdot \sqrt{(RSSI\#m)(RSSI\#n)} = <x_1 \cdot x_2^*> \quad \text{Formula (17)}$$

<Operation/Effect in Third Embodiment>

An operation and an effect of the CDMA transceiver device in the third embodiment discussed above will be explained.

The respective radio signals (ANT#m and ANT#n) received by the plurality of antennas are each demodulated by the wireless receiving unit 103 (302) and converted into the digital signals (sample data) by the A/D converting unit 104 (304). These pieces of sample data are supplied to the timing generation unit 105 and to the despreading unit 106, respectively. Hereafter, the same processes as those excluding the weight generation process in the second embodiment are executed. Except the point that the despreading timing is determined for each of the signals received by the plurality of antennas, the point that each of the signals received by the plurality of antennas is despread at the determined despreading timing and the point that the thus-despread signals corresponding to the number of the plural antennas are combined, other detailed operations are the same as those in the second embodiment.

In the weight generation unit 107, at first, the channel estimation unit 131 generates the channel response vector h having, as the element, the channel estimation value at the individual despreading timing in each piece of sample data corresponding to the signal received by each antenna. Further, the RSSI calculation unit 311 calculates RSSI (RSSI#m, RSSI#n) corresponding to the respective antennas.

The signal correlation matrix generation unit 312 obtains the signal correlation matrix R' on the basis of the despreading timings given from the timing generation unit 105, the sample data (ANT#m. ANT#n) corresponding to the signals received by the respective antennas and RSSIs corresponding to the respective antennas, which are transferred from the RSSI calculation unit 311. Then, the weight calculation unit 313 multiplies the inverse matrix of this signal correlation matrix R' by the channel response vector h, thereby generating the weights w corresponding to the respective fingers in the despreading unit 106.

In the signal correlation matrix generation unit 312 in the third embodiment, the sign bit extraction unit 321-*m* and 321-*n* extracts the sign bit (sign bit signal) respectively from the sample data of the antenna #m and from the sample data of the antenna #n in the vicinity of the despreading timing $t_i$. Then, the sign bit signal with respect to the antenna #m is multiplied by the sign bit signal about the antenna #n, i.e., the signal that is delayed by the delay unit 322, corresponding to the timing difference between the despreading timing $t_i$ and the despreading timing $t_j$ (including the case of i=j) and then averaged (the sign bit correlation signal). This sign bit correlation signal is compensated by the compensating unit 325 by the same method as in the second embodiment or in the modified example of the second embodiment.

This compensated sign bit correlation signal is further compensated by the power compensating unit 326. Namely, an error with respect to RSSI, which is contained in the sign bit correlation signal, is cancelled by RSSI corresponding to each of the antennas that is transferred from the RSSI calculation unit. Thus, the signal compensated by the power compensating unit 326 is used as the element of the signal correlation matrix.

Thus, in the third embodiment, the error with respect to RSSI, which is contained in the signal correlation matrix generated based on only the sign bit, is removed by RSSI calculated by the RSSI calculation unit 311, and it is therefore feasible to obtain the highly accurate signal correlation matrix even in the configuration of the device including the plurality of antennas.

With this operation, according to the third embodiment, it is possible to actualize the high-speed interference reducing process in the same way as in the second embodiment even in the configuration of the device including the plurality of antennas.

The present invention has been discussed so far by way of the preferred embodiments of the present invention. Herein, the present invention has been explained by exemplifying the specified concrete examples, however, it is apparent that these concrete examples can be modified and changed in a variety of forms without deviating from the broad gist and range of the present invention that are defined in Scope of Claims. Namely, the present invention should not be construed to be limited from the details of the concrete examples and the accompanying drawings.

[Others]

The disclosures of Japanese patent application No. JP2006-025553, filed on Feb. 2, 2006 including the specification, drawings and abstract are incorporated herein by reference.

What is claimed is:

1. An interference reduction receiving device demodulating a signal by despreading a digital signal at a plurality of timings, by multiplying each of signals after being despread by a weight corresponding to each of the plurality of timings at which to perform despreading, and by combining the signals, the interference reduction receiving device comprising:

- an estimation unit estimating, based on the digital signal, a channel response vector having, as elements, channel estimation values corresponding to each of the plurality of timings;
- a quantizing unit quantizing the digital signal in the vicinity of each of the plurality of timings;
- a delaying unit delaying each of the quantized signals by a time difference between the timing corresponding to each of the quantized signals and another timing in the plurality of timings;
- a signal correlation matrix generation unit generating a signal correlation matrix having, as the element, each of signal correlation values calculated based on each of the quantized signals and on each of the delay signals that has been delayed by the delaying unit; and
- an weight calculating unit calculating each of the weights corresponding to each of the plurality of timings based on the channel response vector and the signal correlation matrix.

2. An interference reduction receiving device according to claim 1, wherein the signal correlation matrix generation unit sets, as each of the signal correlation values, a first correlation value obtained by multiplying each of the quantized signals by each of the delay signals delayed by the timing corresponding to each of the quantized signals and averaging these signals, and a second correlation value obtained by multiplying each of the quantized signals by the same quantized signal each other and averages these signals.

3. An interference reduction receiving device according to claim 2, wherein the signal correlation matrix generation unit includes a compensation unit to compensate each of the signal correlation values based on each of compensation coefficients for reducing a quantized error on the first correlation value or the second correlation value.

4. An interference reduction receiving device according to claim 3, wherein the compensation unit calculates each of the compensation coefficients based on absolute value information of the first correlation value or the second correlation value, and compensates each of the signal correlation values based on each of the compensation coefficients.

5. An interference reduction receiving device according to claim 3, wherein the compensation unit calculates each of the compensation coefficients according to a time difference on the timings related to the delay signals used for calculating each of the signal correlation values, and compensates each of the signal correlation values based on each of the compensation coefficients.

6. An interference reduction receiving device according to claim 3, wherein the compensation unit determines whether the compensation of each of the signal correlation values is required or not by comparing the time difference on the timings related to the delay signals used for calculating each of the signal correlation values with a predetermined threshold value.

7. An interference reduction receiving device according to claim 3, wherein the compensation unit compensates only the second correlation value in each of the signal correlation values.

8. An interference reduction receiving device demodulating signals by despreading digital signals, at a plurality of timings, into which the signals received by a plurality of antennas are converted, by multiplying each of the signals after being despread by a weight corresponding to each of the plurality of timings at which to perform despreading and corresponding to each of the plurality of antennas, and by combining the signals, the interference reduction receiving device comprising:

- an estimation unit calculating, based on the digital signals, channel response vectors having, as elements, channel estimation values corresponding to each of the plurality of timings;
- a quantizing unit quantizing each of the digital signals in the vicinity of each of the plurality of timings;
- a delaying unit delaying each of the quantized signals by a time difference between the timing corresponding to each of the quantized signals and another timing in the plurality of timings;
- a power calculating unit calculating received signal power of each of the digital signals;
- a signal correlation matrix generation unit compensating each of the signal correlation values calculated based on each of the quantized signals and on each of the delay signals that has been delayed by the delaying unit according to the received signal power of each of the digital signals used as source of each of the signal correlation values, and generating a signal correlation matrix having, as the element, each of the signal correlation values after being compensated; and
- an weight calculating unit calculating each of the weights corresponding to each of the plurality of timings and each of the plurality of antennas based on the channel response vectors and the signal correlation matrix.

9. An interference reduction receiving device according to claim 8, wherein the signal correlation matrix generation unit sets, as each of the signal correlation values, a first correlation value obtained by multiplying each of the quantized signals by each of the delay signals delayed by the timing corresponding to each of the quantized signals and averaging these signals, a second correlation value obtained by multiplying each of the quantized signals by each of the delay signals delayed by the timing corresponding to each of the signals corresponding to the other of the plurality of antennas that is quantized in the vicinity of the same timing as each of the quantized signals and averaging these signals, and a third correlation value obtained by multiplying each of the quantized signals by the same quantized signal each other or by multiplying the signals quantized in the vicinity of the same timing by the same quantized signals each other and averaging these signals.

10. An interference reduction receiving device according to claim 9, wherein the signal correlation matrix generation unit includes a compensation unit to compensate each of the signal correlation values based on each of compensation coefficients for reducing a quantized error on the first correlation value, the second correlation value or the third correlation value.

11. An interference reduction receiving device according to claim 10, wherein the compensation unit calculates each of the compensation coefficients based on absolute value information of each of the signal correlation values, and compensates each of the signal correlation values based on each of the compensation coefficients.

12. An interference reduction receiving device according to claim 10, wherein the compensation unit calculates each of the compensation coefficients according to a time difference on the timings related to the delay signals used for calculating each of the signal correlation values, and compensates each of the signal correlation values based on each of the compensation coefficients.

13. An interference reduction receiving device according to claim 10, wherein the compensation unit determines whether the compensation of each of the signal correlation values is required or not by comparing the time difference on the timings related to the delay signals used for calculating each of the signal correlation values with a predetermined threshold value.

14. An interference reduction receiving device according to claim 10, wherein the compensation unit compensates only the third correlation value in each of the signal correlation values.

15. An interference reduction receiving method in a receiving device demodulating a signal by despreading a digital signal at a plurality of timings, by multiplying each of signals after being despread by a weight corresponding to each of the plurality of timings at which to perform despreading, and by combining the signals, the interference reduction receiving method comprising:

- estimating, based on the digital signal, a channel response vector having, as elements, channel estimation values corresponding to each of the plurality of timings;
- quantizing the digital signal in the vicinity of each of the plurality of timings;
- delaying each of the quantized signals by a time difference between the timing corresponding to each of the quantized signal and another timing in the plurality of timings;
- generating by the receiving device a signal correlation matrix having, as the element, each of signal correlation values calculated based on each of the quantized signal and on each of the delay signals that has been delayed; and
- calculating by the receiving device each of the weights corresponding to each of the plurality of timings based on the channel response vector and the signal correlation matrix.

16. An interference reduction receiving method in a receiving device demodulating signals by despreading digital signals, at a plurality of timings, into which the signals received by a plurality of antennas are converted, by multiplying each of the signals after being despread by a weight corresponding to each of the plurality of timings at which to perform despreading and corresponding to each of the plurality of antennas, and by combining the signals, the interference reduction receiving method comprising:

calculating, based on the digital signals, channel response vectors having, as elements, channel estimation values corresponding to each of the plurality of timings;

quantizing each of the digital signals in the vicinity of each of the plurality of timings;

delaying each of the quantized signals by a time difference between the timing corresponding to each of the quantized signals and another timing in the plurality of timings;

calculating by the receiving device received signal power of each of the digital signals;

compensating by the receiving device each of the signal correlation values calculated based on each of the quantized signals and on each of the delay signals that has been delayed according to the received signal power of each of the digital signals used as source of each of the signal correlation values, and generating by the receiving device a signal correlation matrix having, as the element, each of the signal correlation values after being compensated; and calculating by the receiving device each of the weights corresponding to each of the plurality of timings and each of the plurality of antennas based on the channel response vectors and the signal correlation matrix.

* * * * *